United States Patent [19]

Imura

[11] Patent Number: 5,745,802
[45] Date of Patent: Apr. 28, 1998

[54] CAMERA WITH VIBRATION COMPENSATION DEVICE HAVING ANTI-VIBRATION LENS URGING MECHANISM AND FEED SCREW MECHANISM

[75] Inventor: Yoshio Imura, Kawasaki, Japan

[73] Assignee: Nikon Corporation, Tokyo, Japan

[21] Appl. No.: 847,636

[22] Filed: Apr. 25, 1997

Related U.S. Application Data

[63] Continuation of Ser. No. 702,843, Aug. 27, 1996, abandoned, which is a continuation of Ser. No. 564,918, Nov. 30, 1995, abandoned, which is a division of Ser. No. 377,728, Jan. 25, 1995, abandoned.

[30] Foreign Application Priority Data

Apr. 27, 1994 [JP] Japan ..................... 6-090307
Apr. 27, 1994 [JP] Japan ..................... 6-090324

[51] Int. Cl.$^6$ .................................... G03B 17/00
[52] U.S. Cl. .................................... 396/55
[58] Field of Search ................... 354/400, 195.1, 354/195.12, 202; 348/208; 396/52, 55; 359/554

[56] References Cited

U.S. PATENT DOCUMENTS 4,864,339 9/1989 Gross et al. ..................... 354/202
5,172,276 12/1992 Ueyama et al. ..................... 359/813
5,266,988 11/1993 Washisu ..................... 354/70
5,416,558 5/1995 Katayama et al. ..................... 354/446
5,526,192 6/1996 Imura et al. ..................... 359/813
5,581,317 12/1996 Kitagwa et al. ..................... 396/421

FOREIGN PATENT DOCUMENTS 4-180040 of 1992 Japan.

*Primary Examiner*—Safet Metjahic
*Assistant Examiner*—Christopher E. Mahoney

[57] ABSTRACT

A camera having an optical system which is shiftable to compensate for vibrations affecting the camera, a shift mechanism which shifts the optical system along an axis, and an urging mechanism. The urging mechanism provides an urging force along the axis to urge the optical system and to assist the shift mechanism in shifting the optical system. The urging force of the urging mechanism is approximately 1.5 to 5 times the weight of the optical system. Moreover, a feed screw mechanism includes a male portion and a female portion which cooperate, via a helical groove, to shift the optical system. The feed screw mechanism has an angle of friction and the helical groove has a lead angle that is smaller than the angle of friction.

13 Claims, 20 Drawing Sheets

CAMERA WITH VIBRATION COMPENSATION DEVICE HAVING ANTI-VIBRATION LENS URGING MECHANISM AND FEED SCREW MECHANISM

This application is a continuation of application Ser. No. 08/702,843, filed on Aug. 27, 1996, which is a continuation of prior application No. 08/564,918, filed on Nov. 30, 1995, which is a divisional of prior application Ser. No. 08/377,728, filed on Jan. 25, 1995, abandoned.

BACKGROUND OF THE INVENTION

1. Field of the Invention

The present invention relates to a camera with a vibration compensation device and, more particularly, to improvements in an urging mechanism which urges an anti-vibration lens of a vibration compensation device and to improvements in a feed screw mechanism of a vibration compensation device.

2. Description of the Related Art

A conventional camera can be equipped with a conventional vibration compensation mechanism to compensate for a blurring effect of vibration on resulting photographs. Such blur is typically caused by hand tremors or other vibrations affecting the camera. A conventional vibration compensation mechanism typically consists of a movable optical system and a vibration detection sensor which detects vibrations affecting the camera. When vibrations are detected by the vibration detection sensor, the vibration compensation mechanism shifts the movable optical system in a direction which is perpendicular to the optical axis of the camera. In this manner, the optical system is shifted to compensate for detected vibrations.

Japanese Laid-Open Patent Publication 3-110530 discloses a drive mechanism for a conventional vibration compensation mechanism. As disclosed in Japanese Laid-Open Patent Publication 3-110530, a movable optical system is retained in a lens frame. The lens frame and retained optical system are then moved in a direction which is perpendicular to the optical axis using a motor and a transmission mechanism to drive the lens frame.

In conventional vibration compensation mechanisms, it is desired to drive the optical system at high speed and with high accuracy, thereby achieving drive control of the optical system in accordance with detected vibrations. For this purpose, it is necessary to make small changes in the movement of the optical system in accordance with the drive direction of the movable optical system. However, it is difficult to achieve this type of control of the optical system since the various torque forces affecting the optical system are different, based on the drive direction of the optical system.

Further, FIG. 1 illustrates a conventional vibration compensation device as disclosed in Japanese Laid-Open Patent Publication 4-180040. As illustrated in FIG. 1, an anti-vibration lens 1101 is a movable optical system and is driven in accordance with detected vibrations. A non-rotary female screw 1102 is mounted on a lens frame. A male screw 1104 is in threaded engagement with female screw 1102 and rotates to cause anti-vibration lens 1101 to move. The combination of female screw 1102 and male screw 1104 form a "feed screw mechanism". The conventional vibration compensation device disclosed in Japanese Laid-Open Patent Publication 4-180040 has two feed screw mechanisms. A first feed screw mechanism is parallel to the x-axis, and a second feed screw mechanism is parallel to the y-axis. The first feed screw mechanism is driven by a motor 1105 and the second feed screw mechanism is driven by a motor 1106, thereby moving anti-vibration lens 1101 in a plane orthogonal to the optical axis L.

Generally, it is possible to construct feed screws with a lead angle of up to about 30°. Between 0° and about 30°, the efficiency of a feed screw mechanism tends to be better as the lead angle of the feed screw is increased. Therefore, it is desirable for the lead angle of the screw to be as large as possible, up to about 30°. Japanese Laid-Open Patent Publication 4-180040 does not provide disclosure for the selection of the lead angle of the feed screw of a feed screw mechanism.

In a camera having a vibration compensation device which uses the above-described feed screw mechanism, the male screw of the feed screw mechanism tends to rotate from the dead weight of the optical system when the current through the motors has been shut off. For example, the current through motors 1105 and 1106 is typically shut off when anti-vibration lens 1101 is centered to coincide with the optical axis of the camera. Moreover, anti-vibration lens 1101 tends to move in the lens; barrel when a vibration affects the camera and the current in motors 1105 and 1106 is shut off.

SUMMARY OF THE INVENTION

Therefore, it is an object of the present invention to provide a lens apparatus which can make a change of the load small due to the drive direction of the movable optical system.

It is an additional object of the present invention to provide a lens apparatus in which a movable optical system is driven in accordance with the different torque forces affecting the different drive directions of the movable optical system.

It is also an object of the present invention to provide an improved feed screw mechanism of a lens apparatus which compensates for vibrations by shifting a movable optical system.

Objects of the present invention are achieved by providing a lens apparatus comprising an optical system which is shiftable to compensate for vibrations affecting the lens apparatus; a first shift mechanism which shifts the optical system along a first axis; and a first urging mechanism which provides an urging force along the first axis to urge the optical system and to assist the first shift mechanism in shifting the optical system, the urging force of the first urging mechanism being approximately 1.5 to 5 times the weight of the optical system.

Objects of the present invention are also achieved by providing a lens apparatus comprising an optical system which is shiftable to compensate for vibrations affecting the lens apparatus; and a feed screw mechanism including a male portion and a female portion which cooperate, via a helical groove, to shift the optical system, the feed screw mechanism having an angle of friction and the helical groove having a lead angle that is smaller than the angle of friction.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1:
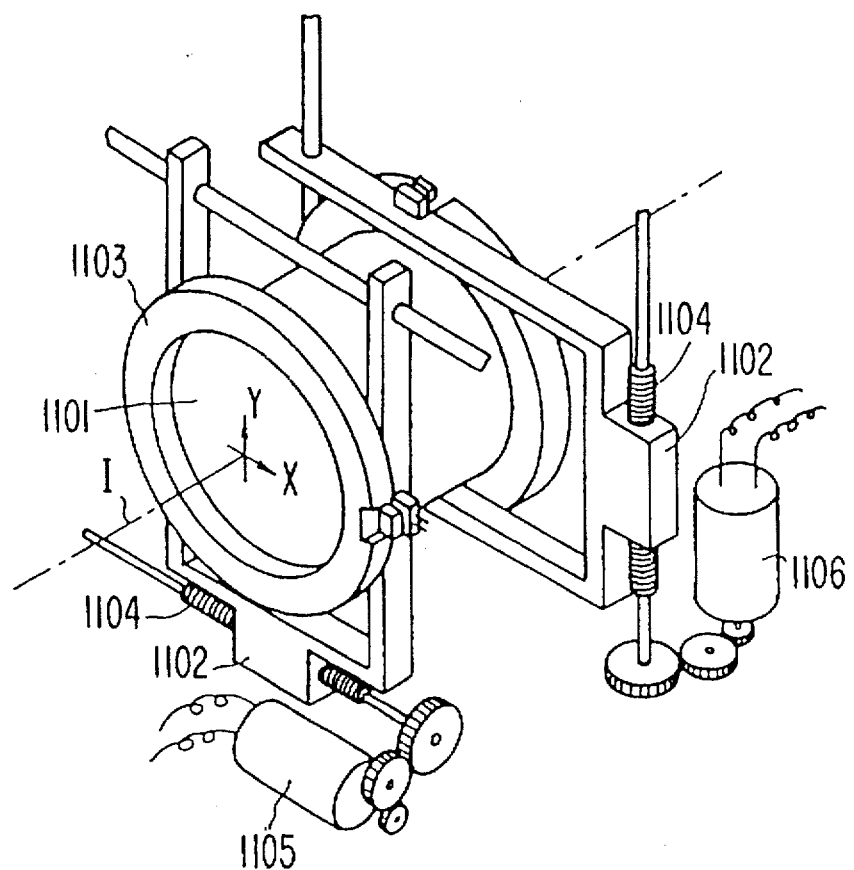
FIG. 1 (Prior Art) is a diagram illustrating an oblique view of a conventional anti-vibration device of a camera.

Reference will now be made to the figures, wherein like reference numerals represent similar structures or processes throughout the figures. FIGS. 2–8, taken together, illustrate a camera having a vibration compensation device, according to embodiments of the present invention. Moreover, the embodiments of the present invention are described herein as relating to the compensation of "vibration". The compensation of "vibration" is intended to also include the compensation for "blur" affecting a photograph. Thus, the terms "blur" and "vibration" are interchangeable, and the terms "anti-vibration lens" and "blur preventing lens" are interchangeable.

Figure 2:
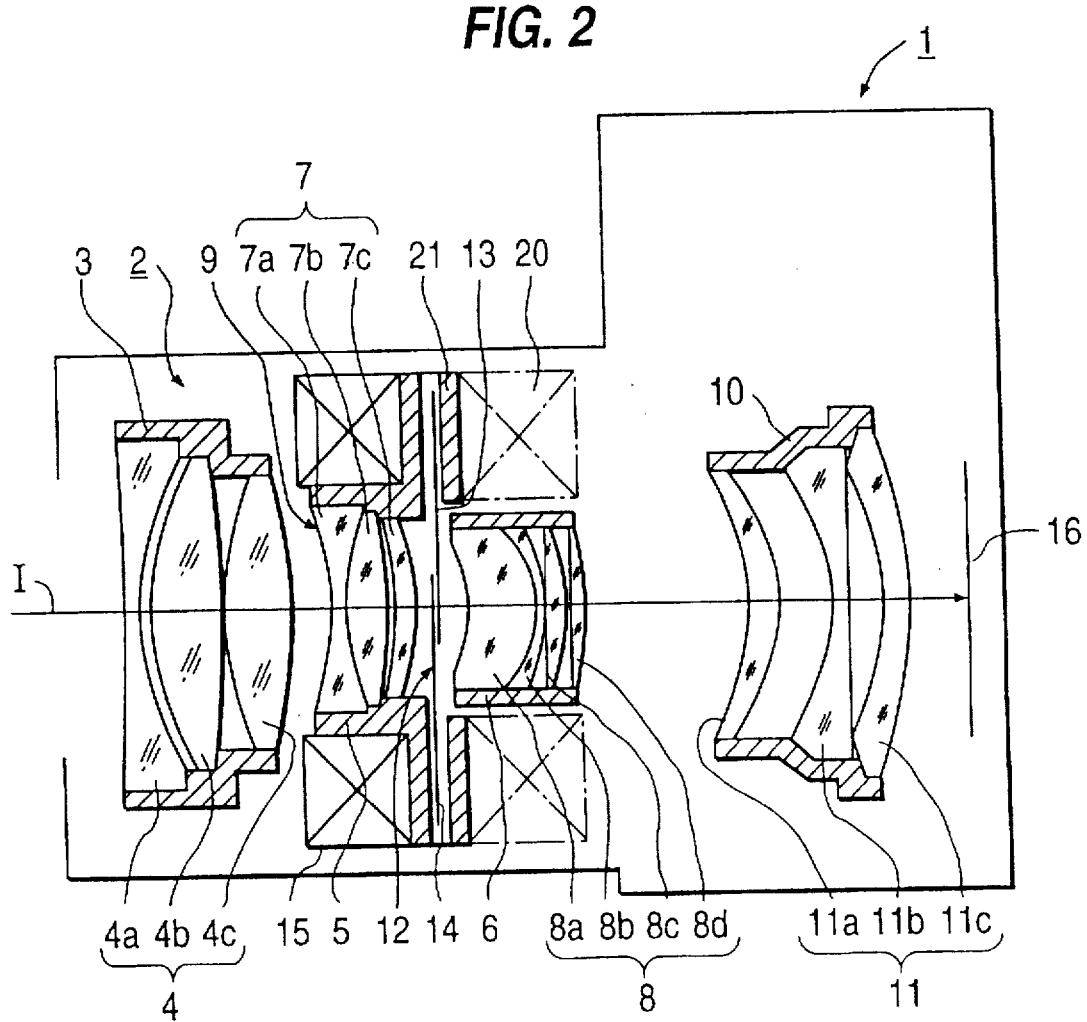
FIG. 2 is a diagram illustrating a cross section of a camera equipped with a lens shutter and a vibration compensation device, according to an embodiment of the present invention.

FIG. 2 is a diagram illustrating a cross section of a camera equipped with a lens shutter and a vibration compensation device, according to an embodiment of the present invention. Referring now to FIG. 2, the camera has a camera body and a photographic lens system 2. Photographic lens system 2 is preferably a "zoom" lens and has an optical axis I extending therethrough. Photographic lens system 2 comprises a first lens group 4, a second lens group 9 and a third lens group 11. First lens group 4 comprises three separate lens 4a, 4b and 4c retained in a lens frame 3. Second lens group 9 comprises a front lens group 7 and a rear lens group 8. Front lens group 7 is retained in a lens frame 5 and comprises three separate lenses 7a, 7b and 7c. Rear lens group 8 is retained and fixed in a lens frame 6 and comprises four separate lenses 8a, 8b, 8c and 8d. Thus, second lens group includes a total of seven separate lenses 7a, 7b, 7c, 8a, 8b, 8c and 8d. Third lens group 11 is retained in a lens frame 10 and comprises three separate lenses 11a, 11b and 11c. Rear lens group 8 functions as an anti-vibration lens and will hereinafter be referred to as either "rear lens group 8" or "anti-vibration lens 8".

Shutter blinds 13 and 14 are driven by a drive unit 15 in a conventional manner to expose film (not illustrated) to light from a subject to be photographed. Light from the subject is formed as an image on an imaging plane 16 via first lens group 4, second lens group 9 and third lens group 11. Imaging plane 16 represents an imaging plane of film (not illustrated) inside the camera. Drive unit 15 is located in the outer circumferential portion of lens frame 5. Shutter blinds 13 and 14 are located directly in front of rear Tens group 8. A vibration compensation device 20 is arranged on a baseplate 21. More particularly, vibration compensation device 20 is arranged on baseplate 21 to the rear of the camera in relation to lens shutter 12, in a space on the external circumference of rear lens group 8. Vibration compensation device 20 uses baseplate 21 as a base member. Vibration compensation device 20 compensates for vibrations affecting the camera by shifting anti-vibration lens 8 in a direction at right angle (perpendicular) to the optical axis I, thereby compensating for image movement on imaging plane 16.

Figure 3:
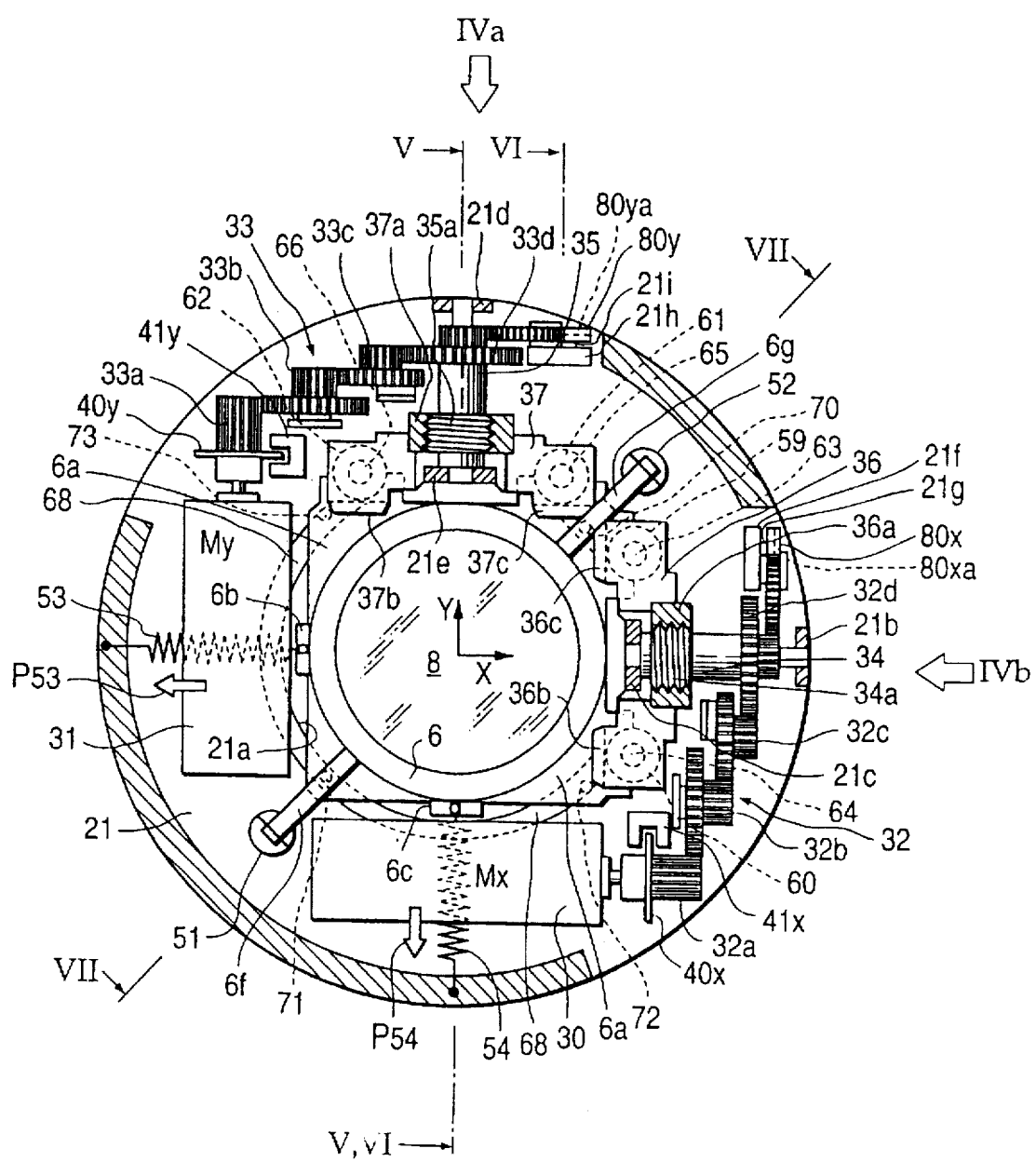
FIG. 3 is a diagram illustrating a cross section of a vibration compensation device of a camera, according to an embodiment of the present invention.

FIG. 3 is a diagram illustrating a cross section of vibration compensation device 20, according to an embodiment of the present invention. Referring now to FIG. 3, drive units 30 and 31 cause anti-vibration lens 8 to move, respectively, in the x-axis direction and the y-axis direction. Drive unit 30 comprises an x-axis motor Mx fixed to baseplate 21. A gear train 32, comprising gears 32a, 32b, 32c and 32d, is used for rotary transmission and transmits drive force from drive unit 30 to a first shaft 34. Gears 32b and 32c are rotatably fixed on baseplate 21. Gear 32d is rotatable and integrally formed with first shaft 34. First shaft 34 is rotatable and axially supported in bearings 21b and 21c to extend in the x-axis direction. Bearings 21b and 21c are arranged in baseplate 21. An x-axis movable member 36 has a female screw 36a in engagement with a male screw portion 34a of first shaft 34. Female screw 36a and male screw portion 34a form a feed screw mechanism. Via movable member 36, lens frame 6 can be moved in the x-axis direction. Thus, movable member 36 acts as a movement amount generation unit.

Drive unit 31 comprises a y-axis motor My fixed to baseplate 21. A gear train 33, comprising gears 33a, 33b, 33c and 33d, is used for rotary transmission and transmits drive force from motor 31 to second shaft 35. Gears 33b and 33c are rotatably fixed on baseplate 21. Gear 33d is rotatable and integrally formed with second shaft 35. Second shaft 35 is rotatable and axially supported in bearings 21d and 21e to extend in the x-axis direction. Bearings 21d and 21e are arranged in baseplate 21. A y-axis movable member 37 has a female screw 37a in engagement with a male screw portion 35a of second shaft 35. Female screw 37a and male screw portion 35a form a feed screw mechanism. Via movable member 37, lens frame 6 can be moved in the y-axis direction. Thus, movable member 37 acts as a movement amount: generation unit. Moreover, gear 32d is engaged with a limit gear 80x. Limit gear 80x has a groove 80xa and is rotatably supported in gear bearing 21f of baseplate 21. Gear bearing 21f has a convex portion 21g. Similarly, gear 33d is engaged with a limit gear 80y. Limit gear 80y has a groove 80ya and is rotatably supported in gear bearing 21h of baseplate 21. Gear bearing 21h has a convex portion 21i.

Figure 6:
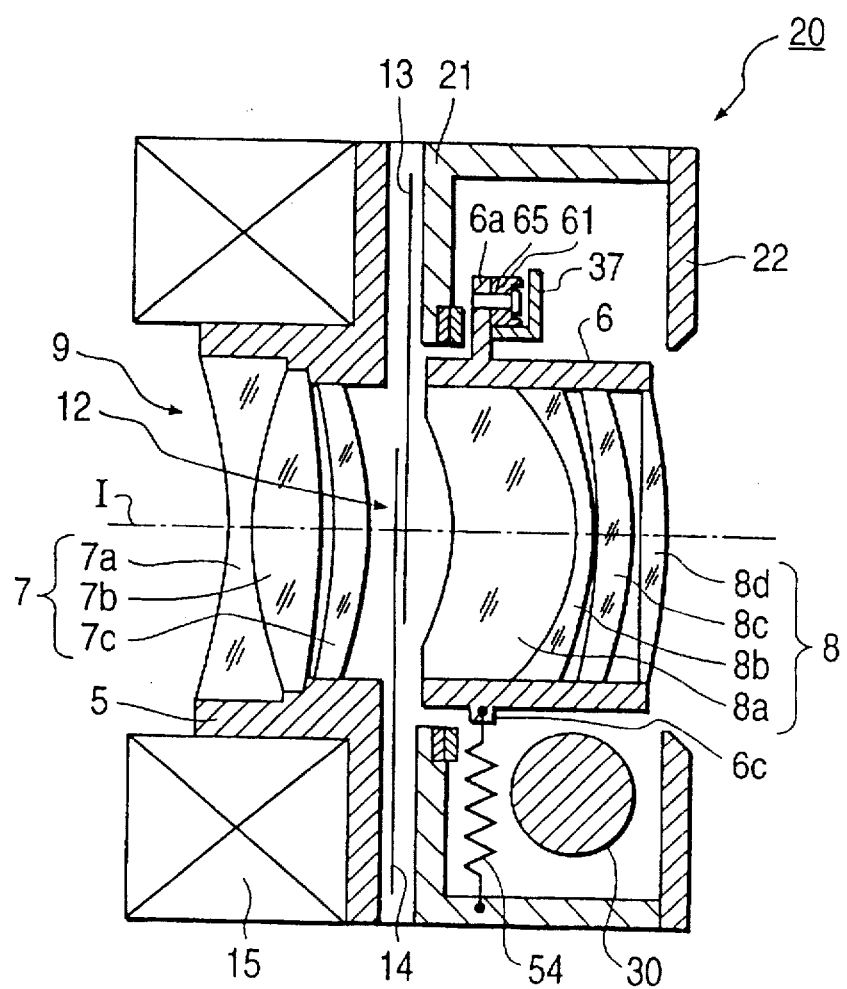
FIG. 6 is a diagram illustrating a cross section along the line VI—VI in FIG. 3 of a vibration compensation device of a camera, according to an embodiment of the present invention.

A flange portion 6a of lens frame 6 faces an aperture portion 21a of baseplate 21 at the external circumferential of lens frame 6. Lens frame 6 has arm portions 6f and 6g. Springs 51 extends between arm portion 6f and baseplate 21. Spring 52 extends between arm portion 6g and baseplate 21. As is clear from FIG. 3 and FIG. 6, rollers 59, 60, 61 and 62 are respectively mounted by roller shafts 63, 64, 65 and 66 in flange portion 6a for free rotation. Also, as illustrated in FIGS. 3 and 6, a spring 53 passes from side to side in approximately the x-axis direction, between baseplate 21 and a spring peg portion 6b, opposite of rollers 59 and 60 of lens frame 6. Moreover, a spring 54 passes from side to side in approximately the y-axis direction, between baseplate 21 and a spring peg portion 6c, opposite of rollers 61 and 62 of lens frame 6. Rollers 59 and 60 are urged by spring 53 into contact with contact members 36c and 36b, respectively. Contact members 36c and 36b are approximately L-shaped in cross section and are at both end of movable member 36. Rollers 61 and 62 are urged by springs 54 into contact with contact members 37c and 37b, respectively. Contact members 37c and 37b are approximately L-shaped in cross section and are at both ends of the movable member 37. Therefore, drive unit 30 shifts anti-vibration lens 8 in the x-axis direction due to the movement of movable member 36 and becomes free in the y-axis direction. Similarly, drive unit 31 shifts anti-vibration lens 8 in the y-axis direction due to the movement of movable member 37, and becomes free in the x-axis direction. As a result, anti-vibration lens 8 can shift in all directions within aperture 21a of baseplate 21.

Moreover, as previously described, springs 53 and 54 urge lens frame 6 by movable members 36 and 37 in the x-axis direction and the y-axis direction, respectively. Lens frame 6 and movable members 36 and 37 are normally in a state of contact. Therefore, the movement of movable members 36 and 37 is reliably transmitted to lens frame 6. Furthermore, via the urging of spring 53, play in the thrust direction of first shaft 34 and play in the direction of urging of screw engagement portions of male screw portion 34a and female screw portion 36a is reduced. Similarly, via the urging of spring 54, play in the thrust direction of second shaft 35 and play in the direction of urging of screw engagement portions of male screw portion 35a and female screw portion 37a is reduced. Accordingly, the drive force of drive units 30 and 31 is accurately transmitted to anti-vibration lens 8. FIG. 3 also illustrates spring forces P53 and P54.

Balls 70, 71, 72 and 73 are maintained in set positions via through holes (not illustrated) of a retainer member 68. Also, disks 40x and 40y are arranged integrally with gears 32a and 33a, respectively, and have numerous holes equidistantly arranged on the rims. These rims are inserted between photointerruptors 41x and 41y arranged on baseplate 21, so that the number of holes of disks 40x and 40y is detected and counted as pulse signals.

Figure 4A:
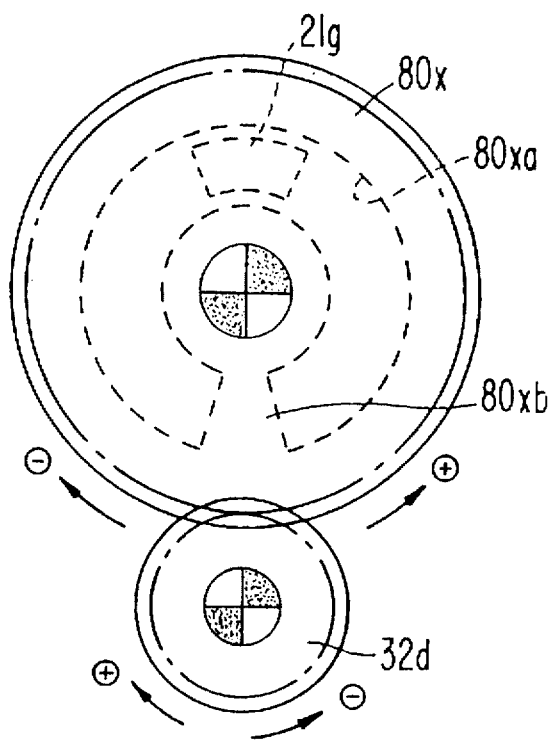
FIGS. 4(A) and 4(B) are diagrams illustrating a view in directions represented by arrows IVa and IVb, respectively, in FIG. 3, and illustrate a limiting mechanism to limit the movement range of an anti-vibration lens.
Figure 4B:
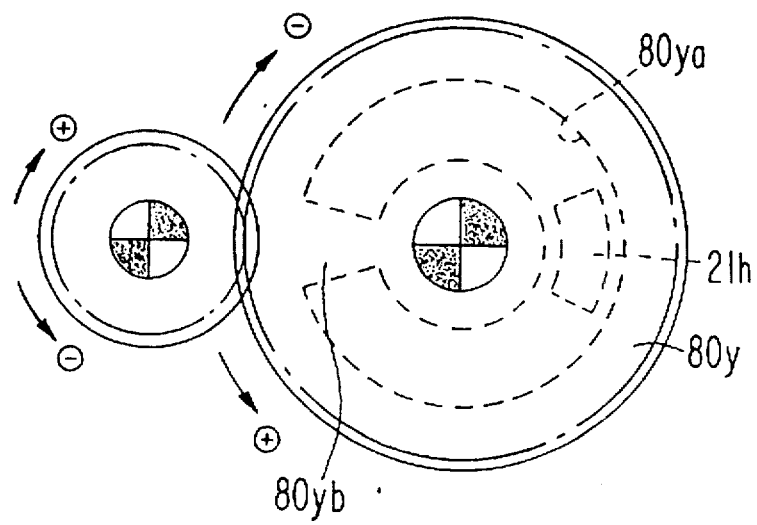

FIG. 4(A) is a diagram illustrating a view in the direction represented by arrow IVa in FIG. 3, and shows the relationship of x-direction gear 32d and limit gear 80x. Similarly, FIG. 4(B) is a diagram illustrating a view in the direction represented by arrow IVb in FIG. 3, and shows the relationship of the y-direction gear 33d and the limit gear 80y. As illustrated by FIGS. 3, 4(A) and 4(B), gears 32d and 33d are respectively engaged with limit gears 80x and 80y. Limit gears 80x and 80y are respectively supported to be rotatable in gear bearings 21f and 21h. Limit gears 80x and 80y act as "limit members" and their motion is described with reference to FIGS. 4(A) and 4(B). Grooves 80xa and 80ya, approximately C-shaped, are respectively formed in the back side (the side towards movable members 36 and 37 in FIG. 3) of limit gears 80x and 80y. Portions within grooves 80xa and 80ya and approximately opposite to gears 32d and 33d are in front of convex portions 21g and 21i respectively protruding from gear bearings 21f and 21h. Accordingly, limit gears 80x and 80y do not rotate 180° in both directions. Rib portions 80xb and 80yb of limit gears 80x and 80y make contact with protruding portions 21g and 21j to thereby mechanically limit rotation.

FIGS. 4(A) and 4(B) illustrate a camera in which anti-vibration lens 8 is at a center position so that the optical axis of anti-vibration lens 8 coincides with the optical axis I of photographic lens system 2. Convex portions 21g and 21i are in a state in which they are located in the center of grooves 80xa and 80ya of limit gears 80x and 80y. By combining the rotation angle of limit gears 80x and 80y and the shift amount of anti-vibration lens 8, the shift amount of anti-vibration lens 8 can be limited to a predetermined range. When the rotation is limited in this manner, drive units 30 and 31 are stopped. By maintaining drive units 30 and 31 in a stopped state for a specific period of time, drive units 30 and 31 can be turned OFF. Moreover, because the rotation of limit gears 80x and 80y is mechanically limited, the occurrence of runaway problems in electrical control systems is reduced.

Figure 5:
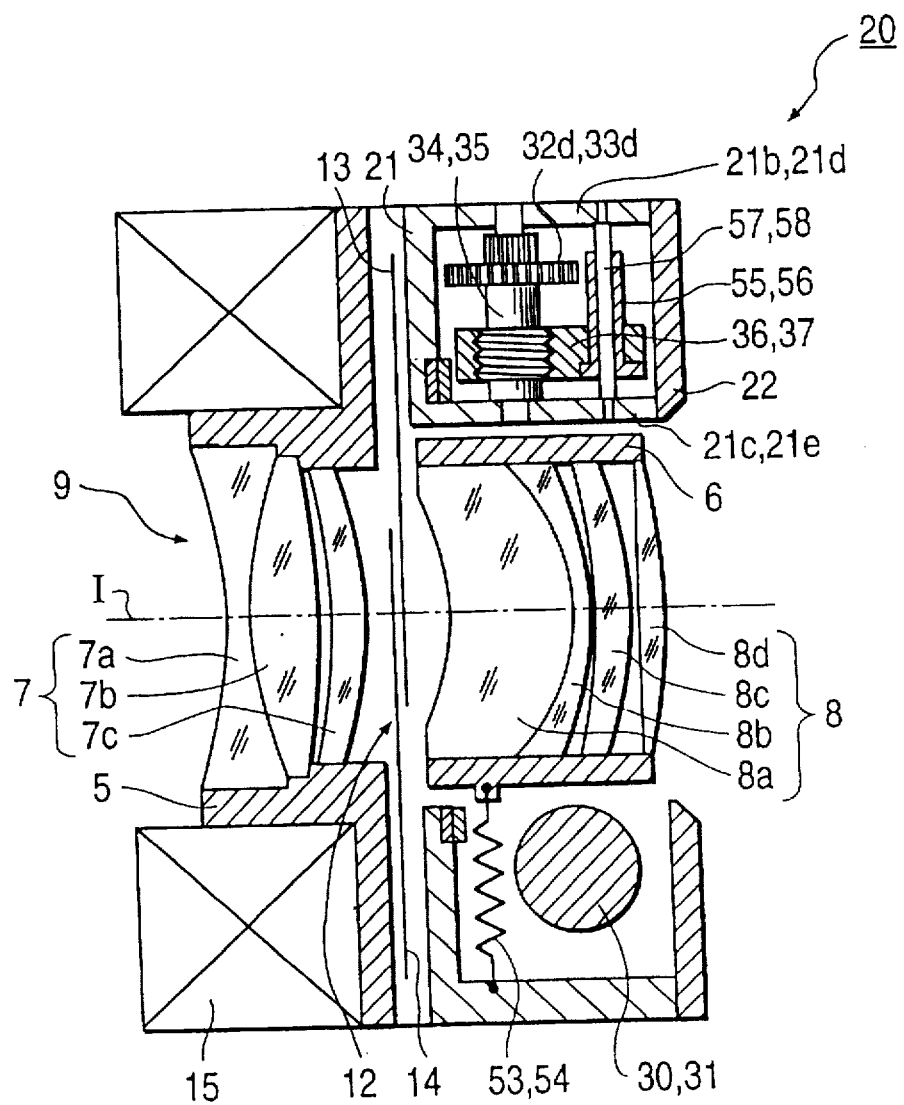
FIG. 5 is a diagram illustrating a cross section along the line V—V in FIG. 3 of a vibration compensation device of a camera, according to an embodiment of the present invention.

FIG. 5 is a diagram illustrating a cross section along the line V—V in FIG. 3 of a vibration compensation device of a camera, according to an embodiment of the present invention. As illustrated by FIGS. 3 and 5, guide member 55 is fixed adjacent to female screw 36a in movable member 36. Guide member 55 is guided by guide shaft 57 and fixed parallel to first shaft 34 in bearings 21b and 21d in baseplate 21. Movable member 36 is moved in the x-axis direction by drive unit 30. Similarly, guide member 56 is fixed adjacent to female screw 37a in movable member 37. Guide member 56 is guided by guide shaft 58 fixed parallel to second shaft 35 in bearings 21c and 21e in baseplate 21. Movable member 37 is moved in the y-axis direction by drive unit 31. FIG. 5 also illustrates a rear portion 22 of the camera.

FIG. 6 is a diagram illustrating a cross section along the line VI—VI in FIG. 3 of a vibration compensation device of a camera, according to an embodiment of the present invention.

Figure 7:
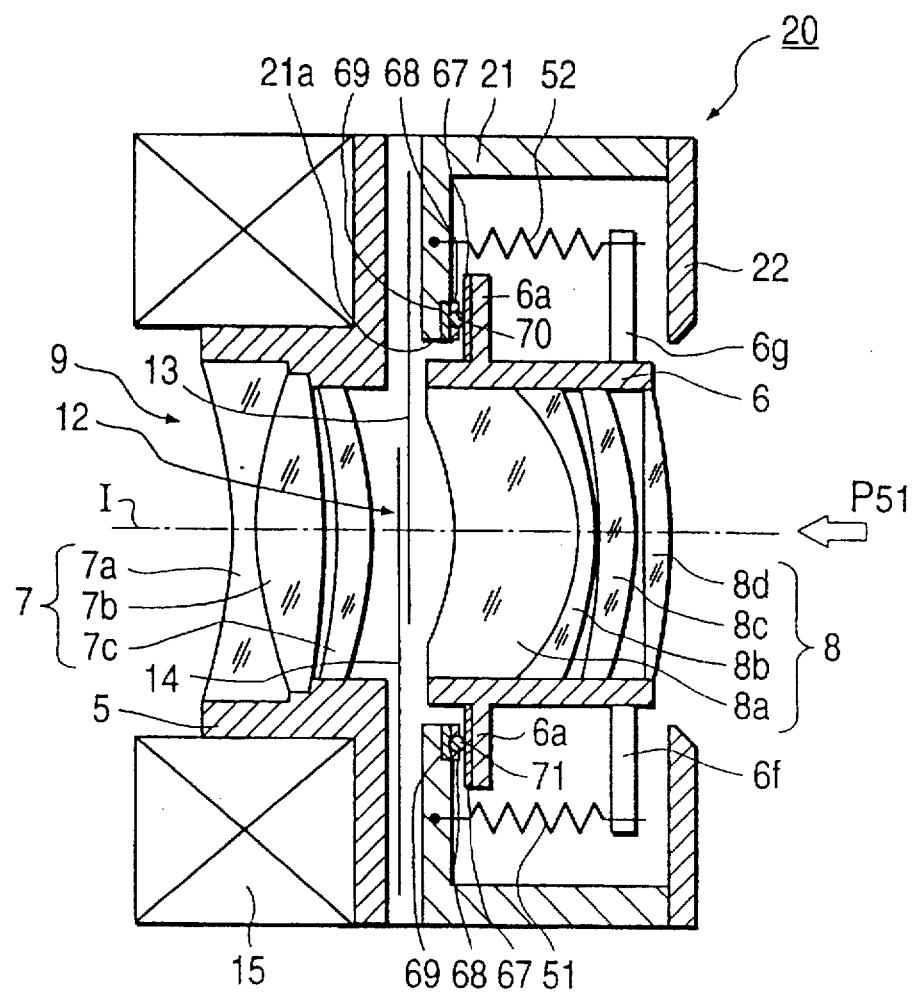
FIG. 7 is a diagram illustrating a cross section along the line VII—VII in FIG. 3 of a vibration compensation device of a camera, according to an embodiment of the present invention.

FIG. 7 is a diagram illustrating a cross section along the line VII—VII in FIG. 3 of a vibration compensation device of a camera, according to an embodiment of the present invention. As illustrated by FIGS. 3 and 7, receiving members 67 and 69 are arranged in a position opposite flange portion 6a and baseplate aperture portion 21a. Receiving members 67 and 69 are made of hardened steel or a like hardness material and are arranged to receive balls 70, 71, 72 and 73 kept in set positions by through holes of retainer member 68. Balls 70, 71, 72, and 73 are kept interposed by receiving members 67 and 69. Therefore, lens frame 6, flange portion 6a, receiving member 67 and balls 70, 71, 72 and 73 are movable with respect to aperture 21a of baseplate 21. Plural through holes (not illustrated) are formed in the external circumference of retainer member 68 to retain, in the interior, the freely rotatable balls 70, 71, 72 and 73. Moreover, as illustrated in FIG. 7, spring 51 extends parallel to lens frame 6 and extends from arm portion 6f to baseplate 21. Similarly, spring 52 extends parallel to lens frame 6 and extends from arm portion 6g to baseplate 21. As a result of the urging action of springs 51 and 52, receiving members 67 and 69 come into normal contact with balls 70, 71, 72 and 73. The force with which lens frame 6 presses on balls 70, 71, 72 and 73 due to springs 51 and 52 equals $P_{S1}$. In this manner, anti-vibration lens 8 is movably supported at low load in a plane at right angles to the optical axis I. Moreover, failure and impairment of optical performance is reduced due to the urging of springs 51 and 52. In FIG. 7, only balls 70 and 71 are illustrated. However, as shown in FIG. 3, balls 72 and 73 are also located around aperture 21a of baseplate 21. Thus, four balls are preferably utilized.

Figure 8:
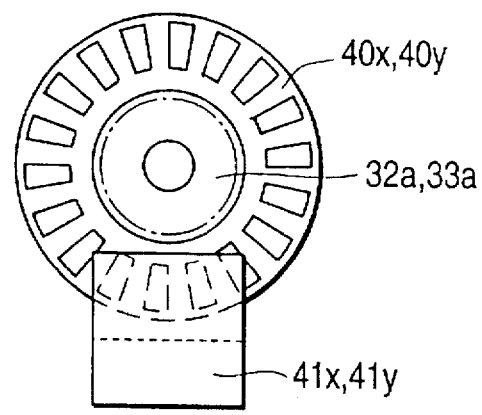
FIG. 8 is a diagram illustrating a position detection unit of an anti-vibration lens of a camera, according to an embodiment of the present invention.

FIG. 8 is a diagram illustrating a position detection unit for anti-vibration lens 8, according to an embodiment of the present invention. Specifically, FIG. 8 illustrates the detection of the position and speed of anti-vibration lens 8. Referring now to FIG. 8, disks 40x and 40y are arranged integrally with gears 32a and 33a and have numerous holes equidistantly arranged on the rims. The rims are inserted between photointerruptors 41x and 41y arranged on baseplate 21, so that the number of holes of disks 40x and 40y is detected as pulse signals. These pulse signals are then counted. With the type of position detection as shown, for example, in FIGS. 4(A) and 4(B), anti-vibration lens 8 reaches a shift limit position in the lower left-hand direction of FIG. 3 when gears 32d and 33d rotate in the direction of the (−) arrows (see FIGS. 4(A) and 4(B). With this position as the origin, the position can be detected by counting the pulses of photointerruptors 41x and 41y. Moreover, detection of tile speed can be performed from the pulse speed.

Accordingly, an encoder is formed by perforated disk 40x and photointerruptor 41x, and an encoder is formed by perforated disk 40y and photointerruptor 41y. These encoders are arranged on the output shaft portions of drive units 30 and 31. Because limit gears 80x and 80y are arranged via the speed reduction gear train, the operating control position and the operating angle of limit gears 80x and 80y can be detected with high resolving power.

Furthermore, due to the operating angle of limit gears 80x and 80y being an angle less than 360°, the shift range of anti-vibration lens 8 can be controlled to a predetermined range by a single limit gear. Moreover, because limit gears 80x and 80y are driven via a feed screw mechanism, no direct load is applied to anti-vibration lens 8 and anti-vibration lens 8 can be limited to the predetermined range with high accuracy.

In the transmission of drive force to lens frame 6 from drive units 30 and 31, the forces acting on first shaft 34 of gear train 32 and second shaft 35 of gear train 33 and their bearings are kept to the necessary minimum and problems of useless play or periodic wear problems can be prevented. Similarly, the forces acting on limit gears 80x and 80y and their bearings are kept to the necessary minimum and problems of useless play or periodic wear can be prevented. Furthermore, the rotation of limiting gear 80x and 80y can be limited to less than one revolution to maximize the degrees of freedom of the gear ratio of gear trains 32 and 33 and the lead angle in the feed screw mechanism.

Moreover, as described above, the drive force of drive units 30 and 31 is transmitted to movable members 36 and 37 via a feed screw mechanism. However, the mechanism to convert rotary motion to rectilinear motion is not intended to be limited to a feed screw motion. For example, a cam mechanism, lever, belt or similar type mechanism can be used. Moreover, as described above, limit gears 80x and 80y are used as a limiter, exemplified by the case of being engaged with the final gears 32d and 33d of gear trains 32 and 33 in the drive force transmission mechanism unit. However, limit gears may, of course, be combined in any position of the gear trains. However, it is advantageous from the standpoint of the reduction gear ration to combine limit gears with final gears of the gear trains.

With vibration compensation device 20 as illustrated in FIGS. 2–8, anti-vibration lens 8 is shifted in a direction orthogonal to the optical axis I. As a result, the image formed on imaging plane 16 is moved to compensate for vibrations, thereby preventing a blurring movement. Moreover, it is possible to arrange drive units 30 and 31, which require a relatively large space, in a positional relationship such that their length direction is at right angles with respect to the optical axis of photographic lens system 2. In addition, as illustrated in FIGS. 5 and 6, it is not necessary to cause drive units 30 and 31 to project on lens shutter 12 or third lens group 11. Thus, it is possible to compactly position drive units 30 and 31 at a high density on the external circumference of lens frame 6 of anti-vibration lens 8. This configuration is also easy to assemble. Further, the space between lens shutter 12 or the interval between second lens group 9 and third lens group 11 is not lost. Moreover, compactness is excellent, for example, in an interchangeable type of photographic lens. The location adjacent to the stop mechanism can also be effectively used.

In a camera according to embodiments of the present invention, first and second drive units 30 and 31 are arranged in an annular space formed in the external circumference of the lens frame 6. Movable members 36 and 37 are movably located in this space. The lengths of drive units 30 and 31 are arranged in a positional relationship at right angles to the optical axis. Therefore, in spite of a simple mechanism unit structure, drive units 30 and 31 can be located without causing an external projection.

In a camera according to embodiments of the present invention, the output shafts of drive units 30 and 31 are respectively located along the x-axis direction and the y-axis direction. Via gear trains 32 and 33, first and second shafts 34 and 35 and first and second movable members 36 and 37, the rotational force of drive units 30 and 31 is converted into rectilinear motion along the x-axis and y-axis direction. Furthermore, vibration compensation device 20 is positioned in an annular space formed in the external circumference of lens frame 6. Vibration compensation device 20 forms a unitized structure using a case member comprising baseplate 21 and rear portion 22 (see FIG. 5). Furthermore, vibration compensation device 20 is relatively small and, as illustrated, for example, by FIG. 2, other complex mechanisms (such as lens shutter 12) can be positioned adjacent to vibration compensation device 20 to effectively utilize space inside the camera.

Figure 9:
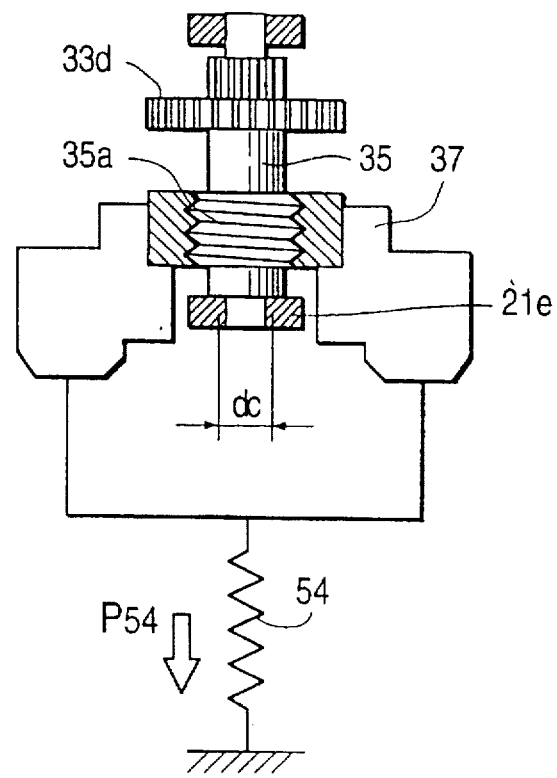
FIG. 9 is a diagram illustrating a drive load of an anti-vibration Ions of a camera, according to an embodiment of the present invention.

FIG. 9 is a diagram illustrating a drive load of anti-vibration lens 8, according to an embodiment of the present invention. FIG. 9 will be used to describe operation of anti-vibration lens in the y-axis direction. The operation of vibration compensation device 20 is similar for the x-axis direction. Therefore, only a description of operation in the y-axis direction is provided and a description of the operation in the x-axis is not repeated. Referring now to FIG. 9, $T_{fr}$ represents the load torque when driving movable member 37 with second shaft 35 moving in a clockwise direction (that is, contrary to spring force $P_{54}$ of spring 54). $T_{fr}$ is represented by $$T_{fr} = \frac{d_m}{2} \times \frac{1+\pi\mu_m d_m \sec\alpha}{\pi d_m - \mu_m l \sec\alpha} P_{54} + \frac{\mu_c d_c}{2} P_{54} \qquad \text{Eq. 1A}$$

When second shaft 35 is driven in a counterclockwise direction (that is, in the direction of spring force $P_{54}$ of spring 54), the load torque $T_{fl}$ is represented by $$T_{fl} = \frac{d_m}{2} \times \frac{-1+\pi\mu_m d_m \sec\alpha}{\pi d_m + \mu_m l \sec\alpha} P_{54} + \frac{\mu_c d_c}{2} P_{54} \qquad \text{Eq. 2A}$$

Here, "I" is the lead of the screw (amount of advance per one rotation), $d_m$ is the effective diameter of the screw, μm is the coefficient of friction of a screw portion, a is the semi-angle of the screw thread, $d_c$ is the average diameter of the contact portion of second shaft 35 and bearing portion 21e, and $\mu_c$ is the coefficient of friction of the contact portion of second shaft 35 and bearing portion 21e.

As an example, the following illustrates the difference of the load torque due to the drive direction in the case when an M3 coarse pitch thread was used, where:

I=0.5 mm, $d_m$=2.675 mm,$\mu_m$=0.3, α=30°, $d_c$=1.3 mm,$\mu_c$=0.3.

$T_{fr}$=0.636 $P_{54}$+0.195 $P_{54}$ =0.831 $P_{54}$ \qquad Eq. 3A $T_{fl}$=0.223 $P_{54}$+0.195 $P_{54}$ =0.418 $P_{54}$ \qquad Eq. 4A The ratio of the load torques due to the drive direction of anti-vibration lens 8 is found as follows:

$$\frac{T_{fr}}{T_{fl}} = \frac{0.831 P_{54}}{0.418 P_{54}} = 1.99 \qquad \text{Eq. 5A}$$

In the case of driving in opposition to spring 54, nearly two times the torque than the reverse becomes necessary. Moreover, considering the weight of anti-vibration lens 8, this ratio becomes further increased. Moreover, when force $P_{54}$ of spring 54 is made large, at the same ratio of load torque, the load torques $T_{fr}$ and $T_{fl}$ become large. When the load torques $T_{fr}$ and $T_{fl}$ are made large with respect to the starting torque of motor My in drive unit 31, a drive speed difference occurs in the drive speed of anti-vibration lens 8 according to the drive direction. As a result, vibration compensation cannot be accurately controlled.

Figure 10A:
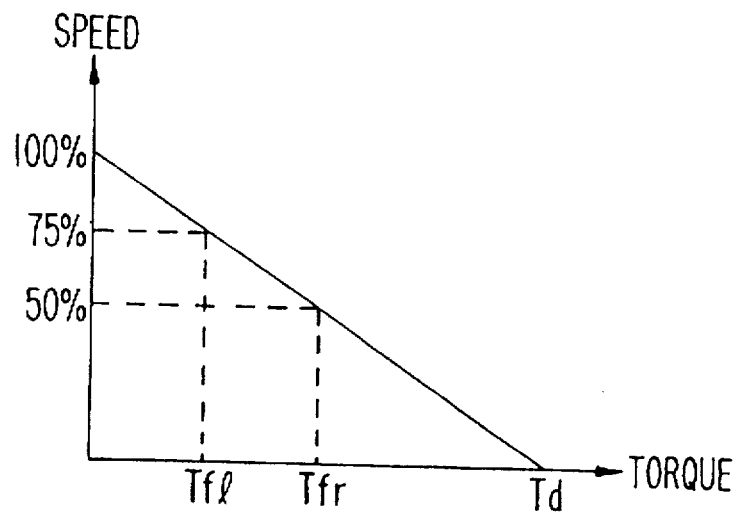
FIGS. 10(A) and 10(B) are diagrams illustrating a speed difference due to drive direction when load torques $T_{fr}$ and $T_{fl}$ act on the drive speed of an anti-vibration lens of a camera, according to an embodiment of the present invention.
Figure 10B:
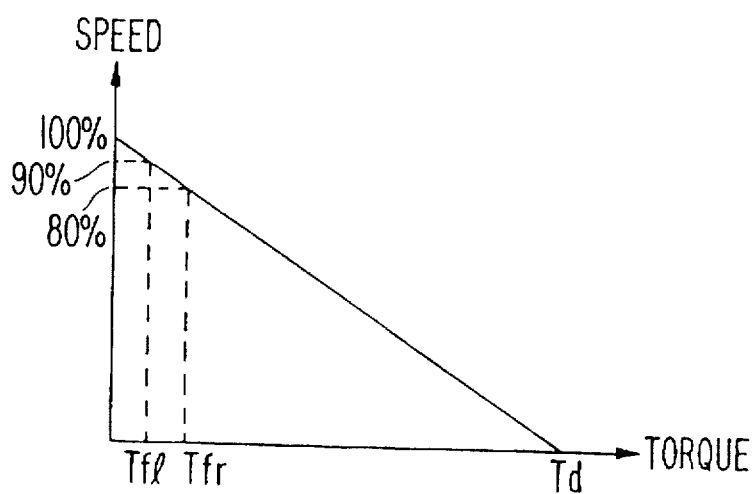

FIGS. 10(A) and 10(B) are diagrams illustrating a speed difference due to drive direction when load torques $T_{fr}$ and $T_{fl}$ act on the drive speed of an anti-vibration lens of a camera, according to an embodiment of the present invention. A DC motor typically has good efficiency when driving a load with about ⅓ to ½ of the starting torque. FIG. 10(A) illustrates the starting torque $T_d$ of a DC motor when the load torque $T_{fr}$ of the feed screw is approximately ½ of the starting torque $T_d$. From the above equations, it is found that the load torque $T_{fl}$ is ¼, and the ratio of speeds of the anti-vibration lens 8 due to the drive direction is 50:75. Therefore, it can be concluded that blur control cannot be accurately performed.

Accordingly, as shown in FIG. 10(B), considering the gear ratio, it is preferable for the load torques $T_{fr}$ and $T_{fl}$ to be 20% or less of the starting torque $T_d$ of the DC motor My. As a result, the speed ratio of anti-vibration lens 8 due to the drive direction becomes a difference of about 10% or less, and accurate blur control can be performed. It is possible to adjust the ratio of the load torques $T_{fr}$ and $T_{fl}$ by changing the lead I of the feed screw. If the value of the lead I is small, the ratio of the load torques can be small. However, special manufacture of the screws increases the cost. Moreover, the starting torque of the DC motor maybe made large. However, this causes the DC motor to become large, thereby requiring a large space.

The spring force $P_{54}$ (see, for example, FIGS. 3 and 9) of spring 54 will now be described. The force of spring 53 is $P_{53}$ (see FIG. 3). The force with which lens frame 6 presses on balls 70, 71, 72 and 73 due to springs 51 and 52 equals $P_{51}$ (see FIG. 7). The three forces $P_{54}$, $P_{53}$, and $P_{51}$ are all the same, and are represented by P. When anti-vibration lens 8 moves in a plane at right angles to the optical axis I, a guide portion load due to balls 70, 71, 72 and 73 is:

$f_b=\mu_b P=0.2P$

The load on the bearings of rollers 59 and 60 in the x-axis direction and rollers 61 and 62 in the y-axis direction is the same:

$f_r=\mu_r P=0.1P$.

The weight of anti-vibration lens 8, lens frame 6, rollers 59–62 and roller shafts 63–66 can collectively be referred to as W. Since it is necessary for this weight W to be supported, the minimum spring force P is given by the relationship:

$P=W+(f_b+f_r)=W+0.3P$.

P becomes:

$P=W/0.7=1.42$ W \qquad Eq.6A

Thus, it is necessary for the spring force of springs 51–54 to be at least 1.5 times the collective weight W. Preferably, considering that the acceleration when driving anti-vibration lens 8 is 0.5 g (g=acceleration due to gravity), $P=(1.5$ W$)/0.7=2.14$ W \qquad Eq. 7A is required, and the force of springs 51–54 should be at least two times the collective weight W.

The effect of the load torque of the feed screw unit must also be considered. For example, when the drive torque of the DC motors is 4 g.cm (gram-centimeters), with a gear ratio of 30, the load torque $T_{fr}$ is given by $T_{fr}$=4×30×0.2 =24 (g.cm)

From this relationship, $T_{fr}$ becomes:

$$T_{fr} = 0.831 \, P_{54},$$

P becomes:

$$P = 29 \, (g)(grams)$$

With the collective weight W set at 6 g, the relationship to the spring force P is:

$$P = (29/6) \times W = 4.8 \, W \qquad \text{Eq. 8A}$$

According to embodiments of the present invention, the force of springs 51–54 should be less than or equal to five times the collective weight W. Preferably, the force of springs 51–54 would be smaller than this. Thus, the gear ratio can be small and the drive speed of anti-vibration lens 8 can be faster. Moreover, because tile starting torque of the DC motor can be smaller, it becomes possible to use a smaller size of DC motor.

In a camera according to the above embodiments of the present invention, the weight of anti-vibration lens 8, lens frame 6, rollers 59–62 and roller shafts 63–66 is collectively referred to as W and the force of springs 51–54 should be between 1.5 and 5 times the collective weight W. Thus, since anti-vibration lens 8, lens frame 6, rollers 59–62 and roller shafts 63–66 must be supported by springs 51–54 and are moved to compensate for blur, these elements, taken together, can be referred to as a "movable vibration compensation optical system". Therefore, embodiments of the present invention can be described as providing a movable vibration compensation optical system having a weight W, wherein the force of springs 51–54 is 1.5 to 5 times the collective weight W.

In a camera according to the above embodiments of the present invention, gear members 80x and 80y act as a limiting mechanism. However, various other types of limiting mechanisms can be used. For example, various forms of gear mechanisms, cams or racks may be used as a limiting mechanism. Furthermore, in a camera according to the above embodiment of the present invention, groove portions are arranged in limit gears 80x and 80y, and convex portions are arranged in a bearing. However, these relationships can be suitably changed and modified to form a limiting mechanism.

The above embodiments of the present invention are related to the compensation of blurring (such as that caused by hand tremors or other vibrations) in a camera. However, the present invention is not limited to use in a camera. For example, the present invention can be used in various other types of optical devices.

In a camera according to the above embodiments of the present invention, an anti-vibration lens or an optical system is urged by an urging force in the range of 1.5 to 5 times the weight of the blurring preventing optical system via a movement amount generating mechanism. The force of springs supporting the anti-vibration lens can be made a suitable magnitude, and can reliably support the anti-vibration lens.

A camera according to the above embodiments of the present invention comprises a vibration compensation optical system which is shiftable to compensate for vibrations affecting the camera. A first shift mechanism (for example, gear train 32 and first shaft 34) shifts the vibration compensation optical system along a first axis (for example, the x-axis). A first urging mechanism (for example, spring 53) provides an urging force along the first axis to urge the movable vibration compensation optical system and to assist the first shift mechanism in shifting the vibration compensation optical system. The urging force of the first urging mechanism is approximately 1.5 to 5 times the weight of the vibration compensation optical system. Moreover, a second shift mechanism (for example, gear train 33 and second shaft 35) shifts the vibration compensation optical system along a second axis (for example, the y-axis) which is perpendicular to the first axis. A second urging mechanism (for example, spring 54) provides an urging force along the second axis to urge the movable vibration compensation optical system and to assist the second shift mechanism in shifting the vibration compensation optical system. The urging force of the second urging mechanism is approximately 1.5 to 5 times the weight of the vibration compensation optical system.

In a camera according to the above embodiments of the present invention, the vibration compensation optical system comprises an anti-vibration lens (for example, anti-vibration lens 8) and a lens frame (for example, lens frame 6) which holds the anti-vibration lens. The weight of the vibration compensation optical system includes the weight of the anti-vibration lens and the weight of the lens frame. In a camera according to an additional embodiment of the present invention, the vibration compensation optical system also comprises rollers (for example, rollers 59–62) and roller shafts (for example, roller shafts 63–66) which allow the first shift mechanism and the second shift mechanism to shift the vibration compensation optical system. The weight of the vibration compensation optical system includes the weight of the rollers and roller shafts.

The above embodiments of the present invention are described as relating to a camera. However, the above embodiments of the present invention can be applied to virtually any type of lens apparatus or optical device which has a lens which is shifted to compensate for vibrations.

Figure 11:
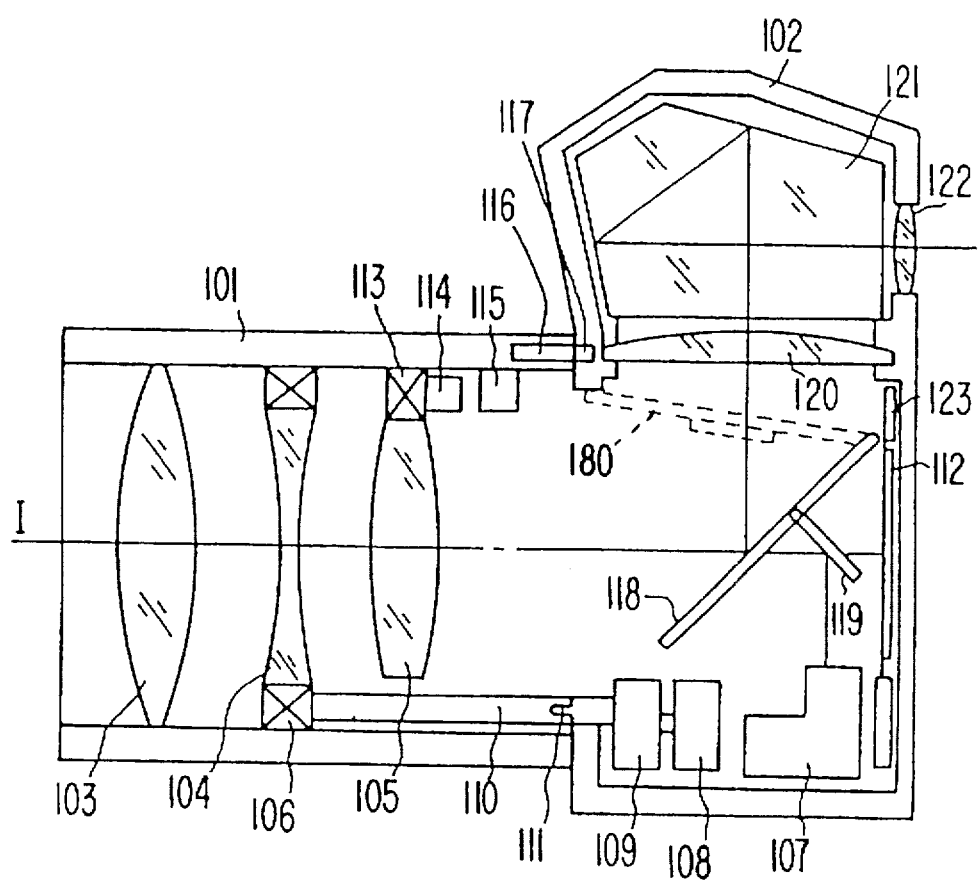
FIG. 11 is a diagram illustrating a cross section of a camera, according to an embodiment of the present invention.

FIG. 11 is a diagram illustrating a cross section of a camera, according to an additional embodiment of the present invention. In FIG. 11, a lens barrel 101 is detachable from a camera body 102. A convex lens 103 is illustrated as a single lens, but represents a group of lenses. A concave lens 104 moves in a direction parallel to the optical axis I of lens barrel 101 to obtain focus. Concave lens 104 is illustrated as a single lens, but represents a group of lenses. A focusing unit 106 drives lens 104 along the optical axis based on signals from a focus detection unit 107. A motor 108 drives lens 104. A speed reduction unit 109 reduces the speed of the rotation shaft of motor 108. A coupling 111 transmits the output of speed reduction unit 109, which is in body 102, to lens barrel 101. A transmission unit 110 transmits the drive force of speed reduction unit 109 from coupling 111 to focusing unit 106. An anti-vibration lens 105 is shifted by an anti-vibration lens drive unit 113 in a plane orthogonal to the optical axis I to compensate for movement of an image formed on an imaging surface 112. Such movement of the image is caused by vibration or other forces affecting the camera. Anti-vibration lens 105 is illustrated as a single lens, but represents a group of lenses. A blur movement detection unit 114, such as an angular velocity sensor or an angular acceleration sensor, detects vibrations affecting the camera and produces a corresponding output signal. An operation control unit 115 receives the output signal of blur movement detection unit 114 and, based on the output signal, drives anti-vibration lens 105 to bring the image on imaging plane 112 to a standstill. Electrical connection points 116 and 117 are on the lens barrel side of the camera and, when lens barrel 101 is mounted to body 102, electrical connection points 116 and 117 are used to provide electricity to anti-vibration lens drive unit 113, blur movement detection unit 114, and operating control circuit 115, when the lens barrel 101 is mounted to the camera body 102.

A semi-transmitting mirror 118 is illustrated in FIG. 11 in a first position. However, semi-transmitting mirror 118 can be moved to a second position 180. When semi-transmitting mirror 118 is in the first position, light from a subject passes through lens 103 and 104 and anti-vibration lens 105. Semi-transmitting mirror 118 then reflects light towards a focusing plate 120 and a pentaprism 121 so that a photographic image is observed in a viewfinder 122. A sub-mirror 119 passes semi-transmission light of semi-transmitting mirror 118 to focus detection unit 107. When the camera goes into a photographic state so that a photograph can be taken, semi-transmitting mirror 118 and sub-mirror 119 are both moved to the second position 180. A shutter 123 is then opened and exposure is thereby performed on imaging plane 112. At this time, or at a time when the camera has been brought into a conventional preparatory photography state in which a release button (not illustrated) is pressed to a conventional half-push position, anti-vibration lens 105 is driven in a plane orthogonal to the optical axis I to stabilize the image blurring movement on imaging plane 112, or to stabilize the image blurring movement in viewfinder 122.

Figure 12:
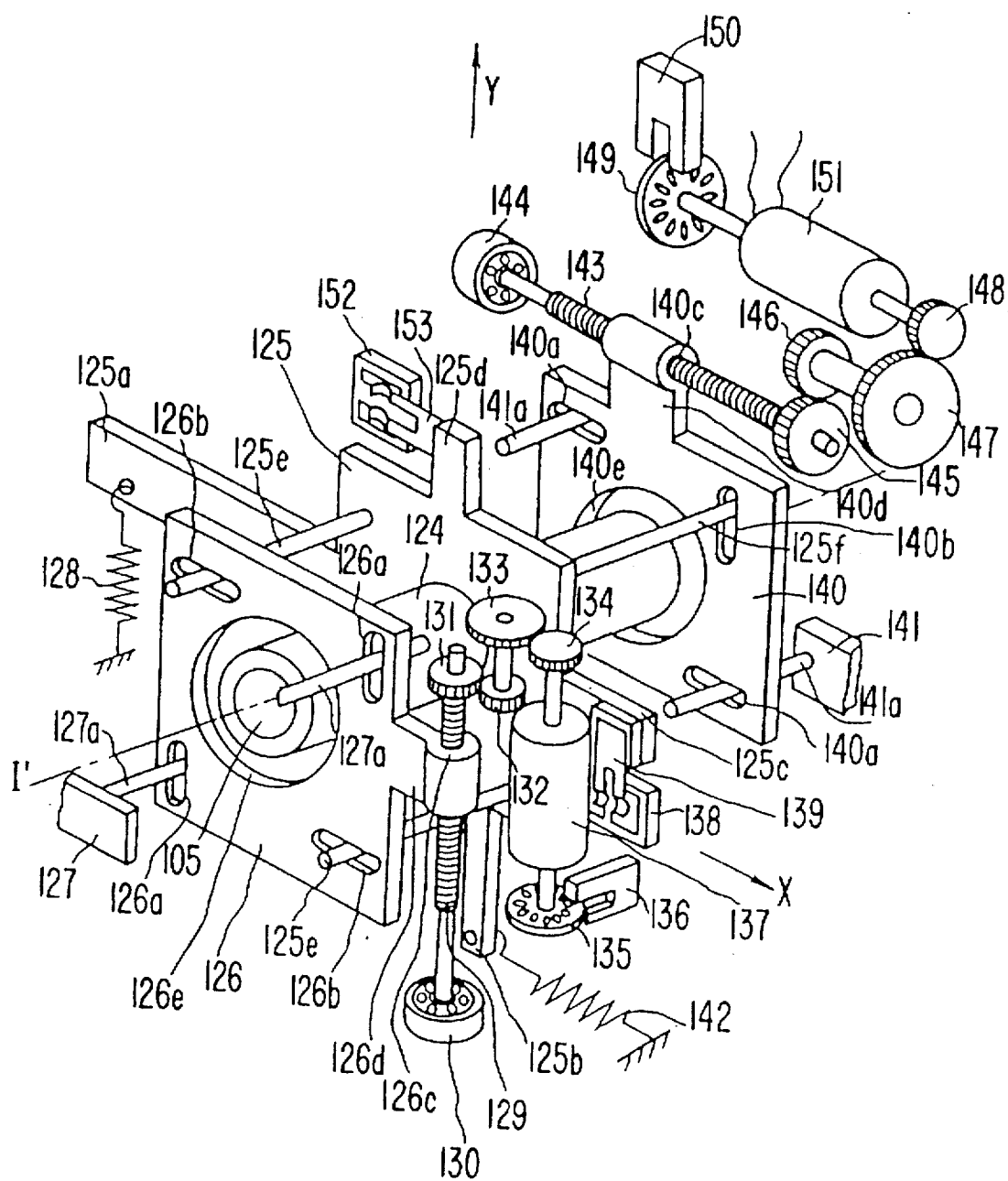
FIG. 12 is a diagram illustrating an oblique view of an anti-vibration lens drive unit of a camera, according to an embodiment of the present invention.

FIG. 12 is a diagram illustrating an oblique view of anti-vibration lens drive unit 113, according to an embodiment of the present invention. An anti-vibration lens barrel 124 receives anti-vibration lens 105. A lens barrel support plate 125 supports anti-vibration lens barrel 124. Anti-vibration lens barrel 124 is fastened orthogonally to lens barrel support plate 125 by screws, or by being integrally molded by an integral molding process. An aperture 126e is arranged in the center of a y-direction guide plate 126 for passage of light to anti-vibration lens 105. Slotted holes 126a are pierced in two places on y-direction guide plate 126 and extend in the y-direction in diagonal positions with aperture 126e therebetween. Slotted holes 126b are pierced in two places on y-direction guide plate 126 and extend in the x-direction in diagonal positions with aperture 126e therebetween. An arm 126d extends at one side of y-direction guide plate 126, and a female screw 126c of a y-direction feed screw mechanism is disposed at an end portion of arm 126d. A fixed member 127 has a pin 127a located in a flat portion and protrudes from lens barrel 101. Only one fixed member 127 is illustrated in FIG. 12; however, there is another fixed member (not illustrated) in a diagonal position with aperture 126e therebetween. Thus, there are a total of two fixed members 127. Similarly, there are a total of two pins 127a. Here, pin 127a fits in slotted hole 126a with gaps in the y-direction. However, pin 127a fits loosely in slotted hole 126a with no gaps in the x-direction. As a result, y-direction guide plate 126 is restricted in the x-direction but has a degree of freedom permitting movement in the y-direction. A male screw 129 and a female screw 126c together form a y-direction feed screw mechanism. Male screw 129 is threaded into female screw 126c disposed on y-direction guide plate 126.

A bearing 130 of male screw 129 receives forces in the thrust direction and the radial direction. A ball bearing is used in the present embodiment of the present invention, but a plain bearing may be used. Bearing 130 is mounted to a fastening member of lens barrel 101. Bearing 130 is drawn in FIG. 12 at only one end of male screw 129, but another bearing (not illustrated) is also disposed at the other end of male screw 129. A pinion gear 134 is mounted on the rotation shaft of y-axis direction drive motor 137. A gear 131 is fixedly mounted to male screw 129. Gears 134, 133, 132 and 131 form a reduction gear train. When current passes through y-direction drive motor 137, the shaft of y-direction drive motor 137 rotates, and thus the male screw 129 rotates. Thus, via the y-direction feed screw mechanism, y-direction guide plate 126 is driven in the y-direction.

An aperture 140e is arranged in the center of an x-direction guide plate 140 for passage of light through anti-vibration lens 105. Slotted holes 140a are formed in two places in x-direction guide plate 140 and extend in the x-direction in diagonal positions with aperture 140e therebetween. Slotted holes 140b (only one slotted hole 140b is illustrated in FIG. 12) are formed in two places in x-direction guide plate 140 and extend in the y-direction in diagonal positions with aperture 140e therebetween. An arm 140d extends at one side of x-direction guide plate 140, and a female screw 140c of an x-direction feed screw mechanism is disposed at an end portion of arm 140d. A fixed member 141 protrudes from lens barrel 101, with a pin 141a located in a flat portion on fixed member 141. FIG. 12 illustrates only one fixed members 141. However, there is another fixed member (not illustrated) in a diagonal position with aperture 140e inbetween, making a total of two fixed members 141. Similarly, there are a total of two pins 141a. Here, pin 141a in slotted hole 140a of x-direction guide plate 140 has gaps in the x-direction, but fits loosely with no gaps in the y-direction. As a result, x-direction guide plate 140 is restricted in the y-direction, but has a degree of freedom permitting movement in the x-direction.

A male screw 143 and a female screw 140c together form an x-direction feed screw mechanism. Male screw 143 is threaded into female screw 140c disposed on x-direction guide plate 140. A bearing 144 of male screw 143 receives forces in the thrust direction and the radial direction. A ball bearing is used in the present embodiment of the present invention, but a plain bearing may be used. Bearing 144 is mounted to a fastening member of lens barrel 101. FIG. 12 illustrates bearing 144 at only one end of male screw 143, but another bearing (not illustrated) is disposed at the other end of male screw 143. A pinion gear 148 is mounted on the rotation shaft of an x-axis direction drive motor 151. A gear 145 is fixedly mounted to male screw 143, and gears 148, 147, 146 and 145 form a reduction gear train. When current passes through x-direction drive motor 151, the shaft of x-direction drive motor 151 rotates, male screw 134 rotates and, via the x-direction feed screw mechanism, x-direction guide plate 140 is driven in the x-direction.

Two pins 125e are diagonally located on the surface of lens barrel support plate 125 opposite y-direction guide plate 126, with anti-vibration lens barrel 124 therebetween. Via slotted holes 126b arranged in y-direction guide plate 126, pins 125e are restricted in the y-direction and fit loosely in the x-direction. Pins 125f (one is not illustrated) are diagonally located on the surface of lens barrel support plate 125 opposite x-direction guide plate 140, with anti-vibration lens barrel 124 therebetween. Via slotted holes 140b arranged in x-direction guide plate 140, pins 125f are restricted in the x-direction and fit loosely in the y-direction. When y-direction guide plate 126 has been moved in the y-direction, lens barrel support plate 125 is restricted in the x-direction by pins 125f, and is induced by pins 125e to move only in the y-direction. Moreover, when x-direction guide plate 140 has been moved in the x-direction, it is restricted in the y-direction by pins 125e and is induced by pins 125f to move only in the x-direction.

Y-direction guide plate 126 is driven in the y-direction by y-axis direction drive motor 137. X-direction guide plate 140 is driven in the x-direction by x-axis direction drive motor 151. Thus, lens barrel support plate 125 is free to move in the y-direction and the x-direction. Accordingly, anti-vibration lens 105 within lens barrel 124 also becomes free to move in the y-direction and the x-direction. A y-direction pressurization spring (tension spring) 128 is suspended between a first arm 125a of lens barrel support plate 125 and a fastening portion of lens barrel 101. Y-direction pressurization spring 128 takes up play between pin 125e and slotted hole 126b, and play between male screw 129 and female screw 126c of the y-direction feed screw mechanism. A x-direction pressurization spring (tension spring) 142 is suspended between a second arm 125b of lens barrel support plate 125 and a fastening portion of lens barrel 101. X-direction pressurization spring 142 takes up play between pin 125f and slotted hole 140b, and play between male screw 143 and female screw 140c of the x-direction feed screw mechanism.

Electrically conductive brushes 139 and 153 are mounted on third and fourth arms 125c and 125d, respectively, of lens barrel support plate 125, and on non-conductive substrates 138 and 152, respectively, having conductive patterns. Conductive brushes 139, 153, arms 125c and 125d, and substrates 139 and 152 together form a centering position detection unit for detecting a center position of anti-vibration lens 105. Lens barrel support plate 125 slides to move anti-vibration lens 105. The center position of anti-vibration lens 105 is the position where the optical axis I' of anti-vibration lens 105 coincides with the photographic optical axis I of the lens barrel. That is, the center position is the position where the eccentricity of anti-vibration lens 105 is zero. Encoders 135 and 149 each have numerous holes perforated in the circumferential portion of opaque disks and are mounted on respective motor shafts. Photointerruptors 136 and 150 have fixed members that are shaped like the character ]. with disks 135 and 149 respectively interposed. Thus, encoder 135 and photointerruptor 136 together form a photocoupler, and encoder 149 and photointerruptor 150 together form a photocoupler. When the shafts of y-direction drive motor 137 and x-direction drive motor 151 rotate, pulse signals are output from photointerruptors 136 and 150. By counting the number of pulses per unit time, the rotational speed of y-direction drive motor 137 and x-direction drive motor 151 can be determined. Thus, the x-direction and y-direction speeds of movement of anti-vibration lens 105 can be determined.

Figure 13:
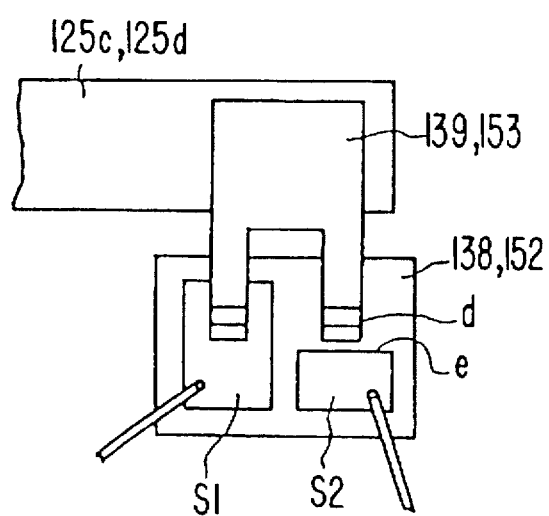
FIG. 13 is a diagram illustrating a position detection brush of an anti-vibration lens of a camera, according to an embodiment of the present invention.

FIG. 13 is a diagram illustrating a position detection brush for anti-vibration lens 105, according to an embodiment of the present invention. Specifically, FIG. 13 illustrates the centering position detection unit formed by conductive brushes 139, 153, arms 125c and 125d, and substrates 139 and 152. When lens barrel support plate 125 moves in the y-direction or the x-direction, arms 125c and 125d move in the up and down direction. Conductive brushes 139 and 153 are respectively mounted on arms 125c and 125d and slide over non-conductive substrates 138 and 152. Conductive patterns $S_1$ and $S_2$ are adhered to baseplates 138 and 152 by copper or gold plating. When conductive brushes 139 and 153 move, and a center d of a brush concave portion travels on the edge eof a pattern, $S_1$ and $S_2$ conduct. At this time, the optical axis I' of anti-vibration lens 105 coincides with the optical axis I of the lens barrel. Thus, the centering of anti-vibration lens 105 is complete. Consequently, by counting the number of pulses from photointerruptors 136 and 150 from the moment when $S_1$ and $S_2$ pass current, the amount of eccentricity is known of the optical axis I' of anti-vibration lens 105 in the y-direction and x-direction with respect to the optical axis I. A y-direction eccentricity amount detection unit of the optical axis I' is formed by encoder 135, photointerruptor 136, substrate 138 and conductive brush 139. An x-direction eccentricity amount detection unit of the optical axis I' is formed by encoder 149, photointerruptor 150, substrate 152 and Conductive brush 153.

Figure 14:
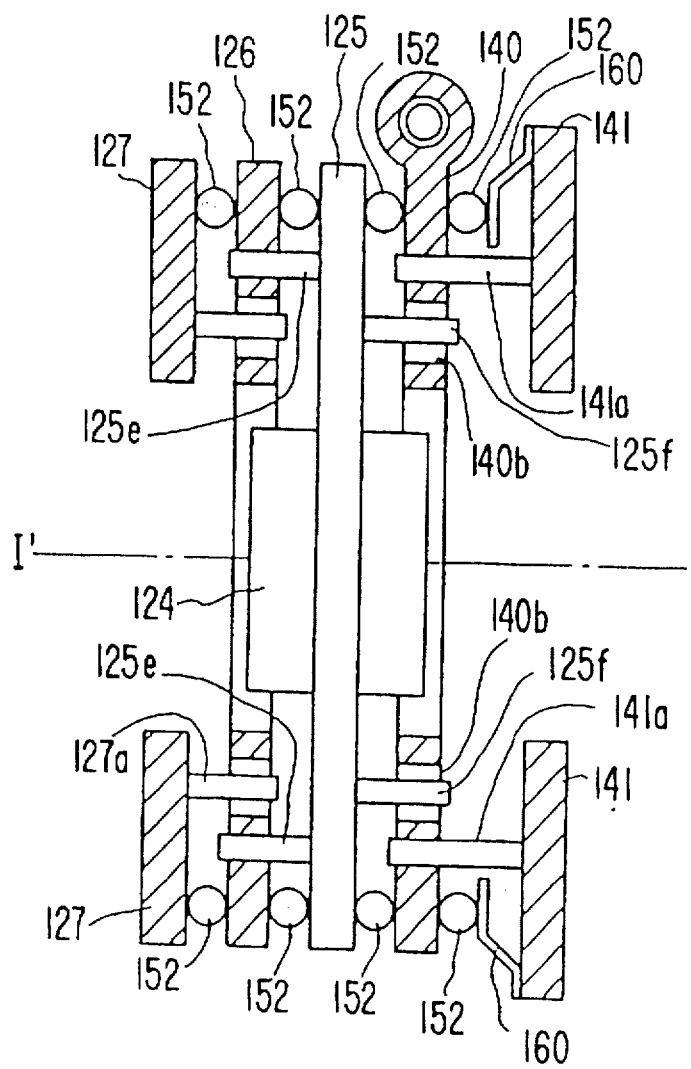
FIG. 14 is a diagram illustrating a cross section in a plane parallel to the y-axis of an anti-vibration lens drive unit of a camera, according to an embodiment of the present invention.

FIG. 14 is a diagram illustrating a cross section in a plane parallel to the y-axis of an anti-vibration lens drive unit of a camera, according to an embodiment of the present invention. Specifically, FIG. 14 is a diagram illustrating a cross section of a horizontal plane in the optical axis I' of FIG. 12. Respective steel balls 152 are inserted between fixed portion 127 and y-direction guide plate 126, lens barrel support plate 125, x-direction guide plate 140, and an elastic member 160. Elastic member 160 is adhered to a fixed member 141. Elastic member 160 presses lens barrel support plate 125, y-direction guide plate 126 and x-direction guide plate 140 in a direction parallel to the optical axis I'. Elastic member 160 is preferably a plate spring, but may be a coil spring. Via the rotation of steel balls 152, lens barrel support plate 125, y-direction guide plate 126 and x-direction guide plate 140 can move, without play, in a plane orthogonal to the optical axis I of the lens barrel. Lens barrel support plate 125, guided in the y-direction by y-direction guide plate 126, and guided in the x-direction by x-direction guide plate 140, are able to move freely in the x-direction and in the y-direction. Accordingly, via the rotation of y-axis direction drive motor 137 and x-axis direction drive motor 151, anti-vibration lens 105 can also move freely in the y-direction and the x-direction in a plane orthogonal to the optical axis I. Anti-vibration lens 105 is driven in a direction to suppress the movement of the image on imaging plane 112.

Figure 15:
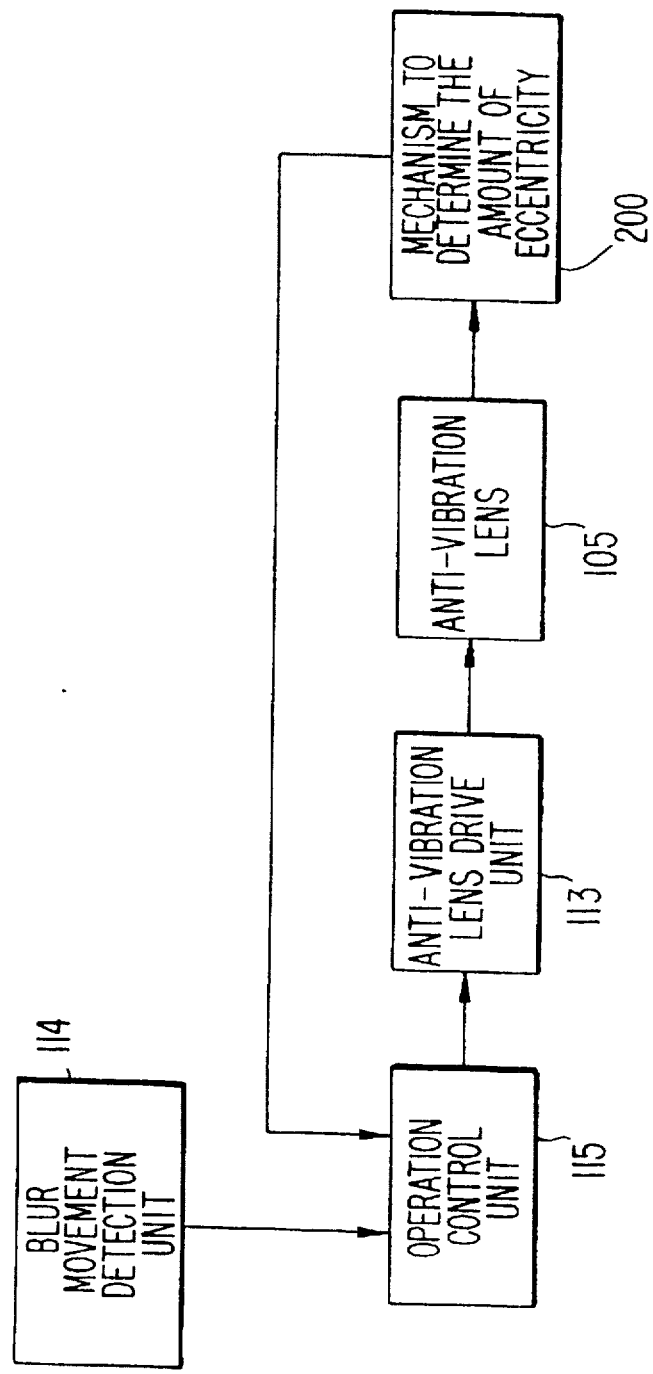
FIG. 15 is a diagram illustrating operation of an anti-vibration Ions drive unit of a camera, according to an embodiment of the present invention.

FIG. 15 is a diagram illustrating operation of anti-vibration lens drive unit 113, according to an embodiment of the present invention. Blur movement detection unit 114, which is arranged to accompany the movement of anti-vibration lens drive unit 113 as in FIG. 11, detects the amount of blurring movement in two perpendicular directions, x and y, and outputs signals based on the amount of detected blurring movement. Operation control unit 115 receives the output signals of blur movement detection unit 114 and, based on the output signals, produces drive signals and supplies the drive signals to anti-vibration lens drive unit 113. Specifically, operation control unit 115 supplies drive current of y-axis direction drive motor 137 and x-axis direction drive motor 151. Anti-vibration lens 105 is actuated by these drive signals. Via y-direction guide plate 126 and x-direction guide plate 140 within anti-vibration lens drive unit 113, anti-vibration lens 105 is moved in a direction to cause a reduction of the image blurring movement. A mechanism to determine the amount of eccentricity 200 comprises Y-direction eccentricity amount detection unit of the optical axis I' (formed by encoder 135, photointerruptor 136, substrate 138 and conductive brush 139) and x-direction eccentricity amount detection unit of the optical axis I' (formed by encoder 149, photointerruptor 150, substrate 152 and conductive brush 153). Mechanism to determine the a mount of eccentricity 200 produces output signals based on the amounts of eccentricity and supply these output signals to operation control unit 115.

During photography, when blurring motion arises due to the depression of the release button (not illustrated) or from other forces affecting the camera, blur movement detection unit 114 detects the amounts of blurring movement in the x-direction and the y-direction and outputs signals based on the detected amounts of blurring movement. These output signals are supplied to operation control unit 115. Operation control unit 115 then calculates amounts of movement of anti-vibration lens 105 in the y-direction and the x-direction, and produces corresponding operation control signals. Anti-vibration lens drive unit 113 is driven in this manner. Namely, impressed voltages, which are caused to change so as to cause the movement velocity of anti-vibration lens 105 to follow the blurring movement velocity of the camera, are output to y-axis direction drive motor 137 and x-axis direction drive motor 151. Thereupon, y-axis direction drive motor 137 drives anti-vibration lens 105 at a velocity corresponding to the blurring movement velocity to bring about eccentricity in the y-direction. Therefore, y-axis direction drive motor 137 causes anti-vibration lens 105 to move a distance which cancels the amount of blurring movement in the y-direction. Similarly, x-axis direction drive motor 151 drives anti-vibration lens 105 at a velocity corresponding to the blurring movement velocity to bring about eccentricity in the x-direction. Thus, x-axis direction drive motor 151 causes anti-vibration lens 105 to move a distance which cancels the amount of blurring movement in the x-direction. Accordingly, male screw 129 rotates due to the drive of y-axis direction drive motor 137 and, via female screw 126c, causes y-direction guide plate 126 to move in a direction to cancel the amount of blurring movement in the y-direction, thereby causing lens barrel support plate 125 to move in an amount to cancel the amount of blurring movement in the y-direction. Similarly, male screw 143 rotates due to the drive of x-direction drive motor 151 and, via female screw 140c, causes x-direction guide plate 140 to move in a direction to cancel the amount of blurring movement in the x-direction, thereby causing lens barrel support plate 125 to move in an amount to cancel the amount of blurring movement in the x-direction.

Then, the amount of movement of lens barrel support plate 125 in the y-direction is detected by the y-direction eccentricity amount detection unit, and the amount of movement of lens barrel support plate 125 in the x-direction is detected by the x-direction eccentricity amount detection unit. The position to which anti-vibration lens 105 has moved is found via these amounts of movement in the x-direction and the y-direction, as a point of x-y coordinates. The amount of movement of anti-vibration lens 105 is fed back to operation control unit 115, and operation control unit 115 effects control so that there is no displacement in the amount of eccentricity of anti-vibration lens 105 and the amount of blurring movement. Presumably, these amounts are equal. Via the y-direction feed screw mechanism (formed by male screw 129 and female screw 126c) and the x-direction feed screw mechanism (formed by male screw 143 and female screw 140c), anti-vibration lens 105 moves to cancel the amount of blurring movement in the image plane.

In a lens apparatus according to above embodiments of the present invention, an optical system is shiftable to compensate for vibrations affecting the lens apparatus. A position detection unit determines when the optical system is at a specific position. For example, conductive brushes 139, 153, arms 125c and 125d, and substrates 139 and 152 together form a "centering" position detection unit for detecting a center position of anti-vibration lens 105. Moreover, a movement amount detection unit determines the distance which the optical system has been shifted from the time when the position detection unit determines that the optical system is at the specific position. For example, a y-direction eccentricity amount detection unit is formed by encoder 135, photointerruptor 136, substrate 138 and conductive brush 139, and an x-direction eccentricity amount detection unit is formed by encoder 149, photointerruptor 150, substrate 152 and conductive brush 153. Operation control unit 115 could be part of the movement amount detection unit and operation control unit 115 would then determine the amount of distance the optical system has been shifted from the time when the position detection unit determines that the optical system is at the specific position.

With the y-direction feed screw mechanism and the x-direction feed screw mechanism, the efficiency of the feed screw increases as the lead angle β increases until the lead angle becomes about 30°. However, even if the lead angle β falls short of 30°, when it becomes greater than some value and the current to the y-axis direction drive motor 137 and the x-axis direction drive motor 151 is cut off, the feed screw mechanism begins a reverse rotation of the male screw due to the force of the female screw acting in the feed screw mechanism. This force acting of the female screw is generated by pressurization spring 128 and pressurization spring 142, or by the force of gravity acting on anti-vibration lens barrel 124.

This kind of force acts on the female screw and, in the case that current is not supplied to the y-axis direction drive motor 137 and the x-direction drive motor 151, the result is that the male screws rotate due to the force acting on the female screw. As a result, anti-vibration lens barrel 124 is biased to one side. When anti-vibration lens barrel 124 undergoes this type of inclination, the feed screw mechanism becomes very difficult to control. Thus, anti-vibration lens 105 moves by the force of a pressurization spring or dead weight when current has been cut off to y-direction drive motor 137 and x-direction drive motor 151 with anti-vibration lens 105 in a centered state. Therefore, it is important to have a camera in which anti-vibration lens barrel 124 does not move by the pressurization spring or dead weight, even when the current to y-axis direction drive motor 137 and x-axis direction drive motor 151 has been cut off.

Figure 16:
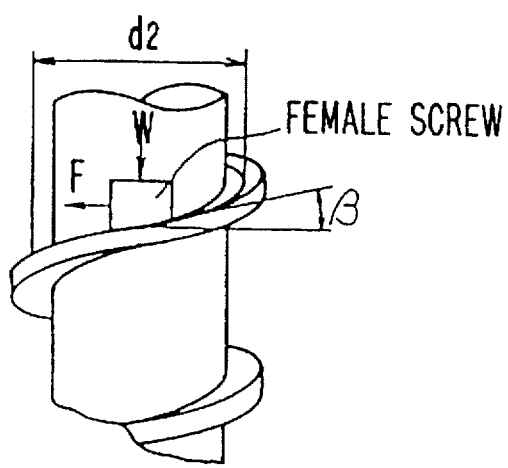
FIG. 16 is a diagram illustrating an oblique view of a square thread, according to an embodiment of the present invention.

FIG. 16 is a diagram illustrating an oblique view of a square thread, according to an embodiment of the present invention. As illustrated in FIG. 16, a force W affects the female screw due to a pressurization spring or dead weight acting in the thrust direction of the male screw. With a feed screw mechanism, the force F loosens the female screw because the female screw is a non-rotational screw. Force F correspondingly causes the male screw to rotate. Moreover, $d_2$ is the effective diameter of a square thread β is the flank angle of the screw, or the "lead angle". Here, for the sake of simplification, a situation is described in which the female screw rotates around the male screw. However, in an actual feed screw mechanism, a load W acting on the female screw is equivalent to a tangential force on an effective diameter $d_2$. Therefore, load W causes the male screw to rotate.

If the force F causing the female screw to rotate is positive, and consequently the female screw is not caused to rotate by the load W, the male screw does not rotate even though the load W due to a pressurization spring or dead weight acts on the female screw. In addition, the male screw does not rotate even if current is cut off from y-axis direction drive motor 137 and x-axis direction drive motor 151. Thus, anti-vibration lens barrel 124 does not move.

Figure 17:
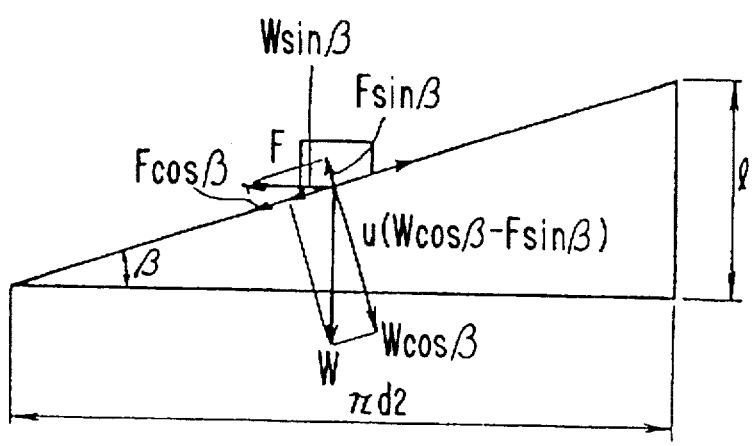
FIG. 17 is a diagram illustrating a development of a square thread to represent the equilibrium of forces on a square thread, according to an embodiment of the present invention.

This condition is described using the development of a square thread in FIG. 17. FIG. 17 is a diagram illustrating a development of a square thread to represent the equilibrium of forces on a square thread, according to an embodiment of the present invention.

In FIG. 17, the effective diameter $d_2$ of the square thread is the average direct distance of the thread cylinder of the male screw and the thread cylinder of the female screw. I is the lead, the distance by which the female screw advances when the male screw has rotated one turn β is the flank angle of the screw, or the "lead angle", and is given by $$\beta = \tan^{-1}(l/\pi d_2) \qquad \text{Eq. 1B}$$

The screw surface is hereinafter called the flank surface. A force F on the flank surface loosens the female screw, a component F cos β acts in parallel to the flank surface and a component W sin β of the load W acts in parallel to the flank surface. The loosening force along the flank surface is described as follows:

$$F \cos\beta + W \sin\beta \qquad \text{Eq. 2B}$$

On the other hand, the component of the force F perpendicular to the flank surface is F sin β, and the component of the load W perpendicular to the flank surface is W cos β. The resultant force multiplied by the coefficient of friction β of the flank surface becomes a force which maintains the female screw to oppose the force along the flank surface, to loosen the female screw. Thus, the frictional force maintaining the female screw becomes:

$$\mu(W \cos\beta - F \sin\beta) \qquad \text{Eq. 3B}$$

Due to the equilibrium of forces, Eq. 2B and Eq. 3B become equal, thereby producing the following Eq. 4B:

$$F \cos\beta + W \sin\beta = \mu(W \cos\beta - F \sin\beta) \qquad \text{Eq. 4B}$$

If Eq. 4B is solved for the tangential force F on the effective diameter $d_2$, the following Eq. 5B results:

$$F = W(\mu\cos\beta - \sin\beta)/(\cos\beta + \mu\sin\beta) \qquad \text{Eq. 5B}$$

Dividing numerator and denominator of Eq. 5B by cos β and applying the trigonometric relationship in the following Eq. 6B, the following Eq. 7B is obtained:

$$\sin\beta/\cos\beta = \tan\beta \qquad \text{Eq. 6B}$$

$$F = W(\mu - \tan\beta)/(1 + \mu\tan\beta) \qquad \text{Eq. 7B}$$

Here, with the friction angle of the flank surface equal to ρ, the following Eq. 8B results:

$$\mu = \tan\rho \qquad \text{Eq. 8B}$$

By inserting Eq. 8B into Eq. 7B, the following Eq. 9 results:

$$F = W(\tan\rho - \tan\beta)/(1 + \tan\rho \cdot \tan\beta) \qquad \text{Eq. 9}$$

Trigonometrically, Eq. 9 becomes:

$$F = W \tan(\rho - \beta) \qquad \text{Eq. 10}$$

In Eq. 10, in the case of a square thread, if β becomes ≤ρ, (that is, if the lead angle is smaller than the friction angle of the flank surface), a tangential force F on an effective diameter $d_2$ becomes necessary to loosen the screw, and spontaneous loosening of the screw does not occur.

If this kind of square thread is applied to the feed screw mechanism of an anti-vibration device in a camera, anti-vibration lens barrel 124 does not spontaneously move with the rotation of male screws 129 and 143 in the case that the current is cut off from y-axis direction drive motor 137 and x-axis direction drive motor 151, and even though the dead weight or force of pre-load springs 128 and 142 of anti-vibration lens barrel 124 act on female screws 126c and 140c. Accordingly, anti-vibration lens 105 also does not move. Anti-vibration lens barrel 124 is in a state of standstill at the position when the current is cut off from y-axis direction drive motor 137 and x-axis direction drive motor 151.

At the position where current is cut off from y-axis direction drive motor 137 and x-axis direction drive motor 151, for example, the optical axis I' of anti-vibration lens 105 coincides with the optical axis I of lens barrel 100. In addition, the position at which the eccentricity of anti-vibration lens 105 is zero. That is, anti-vibration lens 105 is at the centering position. When the camera is in a non-photographic state, current is cut off from y-axis direction drive motor 137 and x-axis direction drive motor 151, and anti-vibration lens 105 remains in the centering position. The effect is that, passing current through y-axis direction drive motor 137 and x-axis direction drive motor 151, when photography is again initiated to cause the camera anti-vibration drive mechanism to again start compensating for vibration, the control range of anti-vibration lens 105 can be a maximum. Because anti-vibration lens 105 is maintained in the centering position, retaining mechanisms are not necessary, and the drive mechanism of anti-vibration lens 105 can be simple.

By making the lead angle β in a square thread smaller than the friction angle ρ of the flank surface, the lead angle of the feed screw may be selected as follows to retain anti-vibration lens 105 in a specific position (for example, to retain anti-vibration lens 105 in the centering position). For example, assume the coefficient of friction μ of the flank surface is μ=0.35. The frictional angle ρ of the flank surface is given by the following Eq. 11:

$$\rho = \tan^{-1}(\mu) = \tan^{-1}(0.35) = 19.29° \qquad \text{Eq. 11}$$

Because the lead angle β is β≤ρ, the lead angle β may be less than or equal to 91.29°.

Thus, in a camera anti-vibration device which used a feed screw mechanism as previously described and illustrated in FIG. 12, there is no movement of anti-vibration lens barrel 124 when the current is cut off from y-axis direction drive motor 137 and x-axis direction drive motor 151 due to the force of pressurization springs 128 and 142, or due to the dead weight of anti-vibration lens barrel 124 in the direction of gravity or the direction of pressurization in the case that a square thread is used in the feed screw mechanism, the coefficient of friction of the flank surface is 0.35, and the lead angle are less than or equal to 19.29°. Therefore, a state of standstill of anti-vibration lens barrel 124 is maintained. In other words, anti-vibration lens barrel 124 can be maintained in the centering position without any auxiliary support in the case that the position in which the current is cut off from y-axis direction drive motor 137 and x-axis direction drive motor 151 is the centering position of anti-vibration lens 105.

In summary, a lens apparatus according to the above embodiment of the present invention comprises an optical system (for example, anti-vibration lens 5) and a feed screw mechanism (for example, x-direction feed screw mechanism formed by male screw 43 and female screw 40c, or y-direction feed screw mechanism formed by male screw 29 and female screw 26c). The optical system is shiftable to compensate for vibrations affecting the lens apparatus. The feed screw mechanism comprises a male portion and a female portion which cooperate, via a helical groove, to shift the optical system. The feed screw mechanism has an angle of friction and the helical groove has a lead angle that is smaller than the angle of friction.

Next, a triangular feed screw mechanism according to an additional embodiment of the present invention is described with reference to FIGS. 18 and 19. Specifically, with a triangular thread used in the feed screw mechanism, the condition for anti-vibration lens barrel 124 not to move due to pressurization springs or dead weight when the current to y-axis direction drive motor 137 and x-axis direction drive motor 151 is cut off is described in relation to FIGS. 18 and 19.

Figure 18:
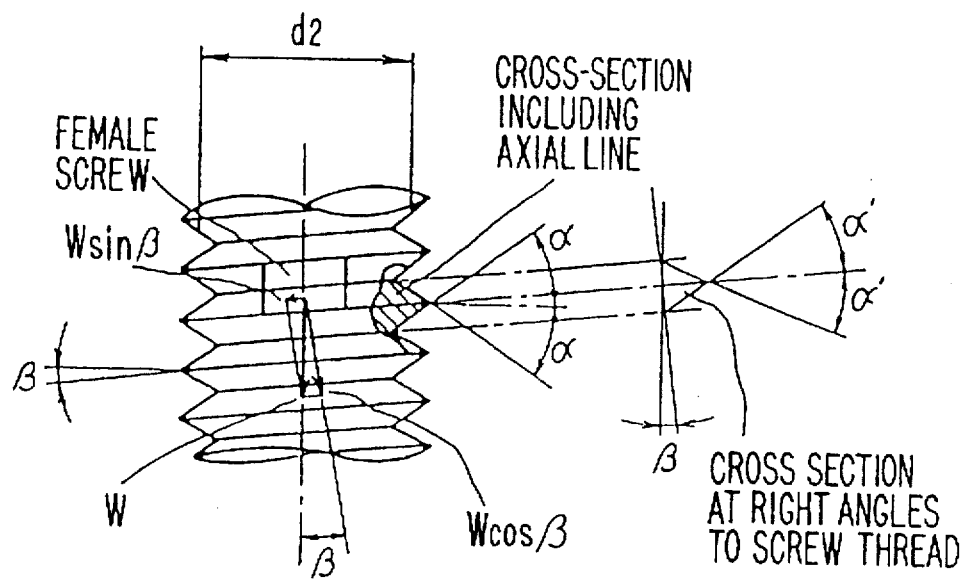
FIG. 18 is a diagram illustrating a flank angle and a lead angle of a triangular thread, according to an embodiment of the present invention.

Reference will now be made to FIG. 18, which is a diagram illustrating a flank angle and a lead angle of a triangular thread, according to an embodiment of the present invention. In the case of a triangular thread, when pressurization springs 128 and 142 or the dead weight W of anti-vibration lens barrel 124 act in a direction parallel to the axial line, as shown in FIG. 18, a force is generated which becomes $W \sin \beta$ in the screw loosening direction. The force becomes $W \cos \beta$ in a direction at right angles to the lead angle. Here, a cross section at right angles to the flank angle (that is, an angle which is half of the vertex angle intersected by a cross section that is inclined to the extent of the lead angle $\beta$ with respect to the axial line, as shown in FIG. 18) becomes a value $\alpha'$, which is smaller than the flank angle $\alpha$. In a triangular thread, force is generated at right angles with respect to a flank surface which has an inclination of this angle or $\alpha'$.

Figure 19:
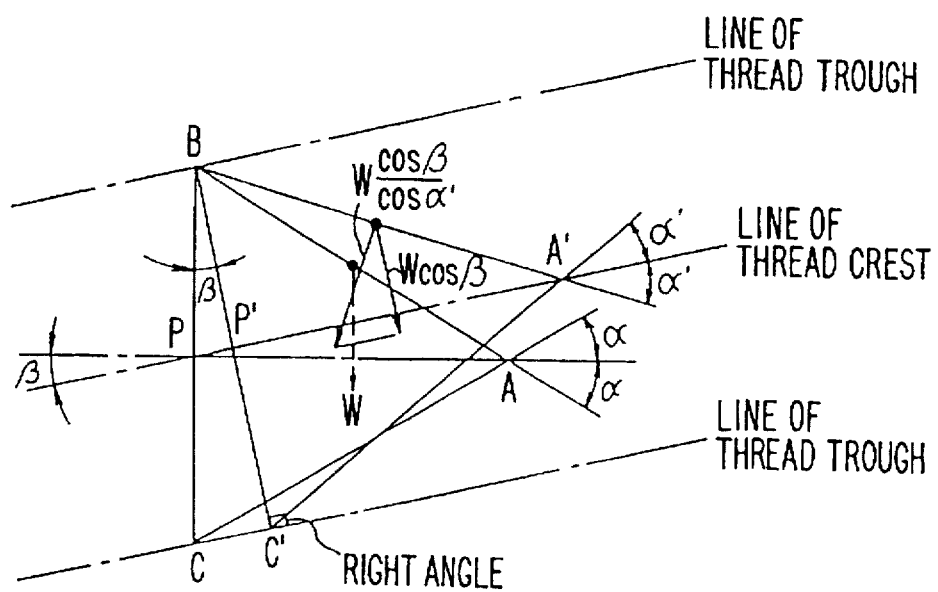
FIG. 19 is a diagram illustrating the thread shape when a thread of a triangular screw thread is sectioned in a cross section at right angles to the lead angle, according to an embodiment of the present invention.

FIG. 19 is a diagram illustrating the thread shape when a thread of a triangular screw thread is sectioned in a cross section at right angles to the lead angle, according to an embodiment of the present invention. Specifically, FIG. 19 is an enlarged diagram showing the relationship of $\alpha$ and $\alpha'$. As illustrated in FIG. 19, a force $W \cos \beta$ at right angles to the lead angle includes a component $W \cos \beta / \cos \alpha'$ perpendicular to the flank. In other words, a force $W \cos \beta / \cos \alpha'$ acts perpendicular to the: surface on the flank of the screw. Here, the relationship of the flank angle $\alpha$ and $\alpha'$ determined in accordance with the following equations Eq. 12 through Eq. 17. With the point P as the center point of the line BC, and the point P' as the center point of the line BC':

$$BP'=BP \cos\beta \qquad \text{Eq. 12}$$

$$P'A'=PA \qquad \text{Eq. 13}$$

$$\tan\alpha=BP/PA \qquad \text{Eq. 14}$$

$$\tan\alpha'=BP'/P'A' \qquad \text{Eq. 15}$$

Substituting the value from Eq. 12 into the numerator of Eq. 15, and Eq. 13 into the denominator:

$$\tan \alpha'=BP \cdot \cos\beta/PA \qquad \text{Eq.16}$$

Substituting Eq. 14 into the right-hand side of Eq. 16, the following Eq. 17 is obtained:

$$\tan\alpha=\tan\alpha\cos\beta \qquad \text{Eq. 17}$$

Equation 17 represents the relationship of the flank angle $\alpha$ and $\alpha'$. Consequently, the force F on the tangent of the effective diameter $d_2$ of the triangular thread and loosening the screw is found as described below.

Figure 20:
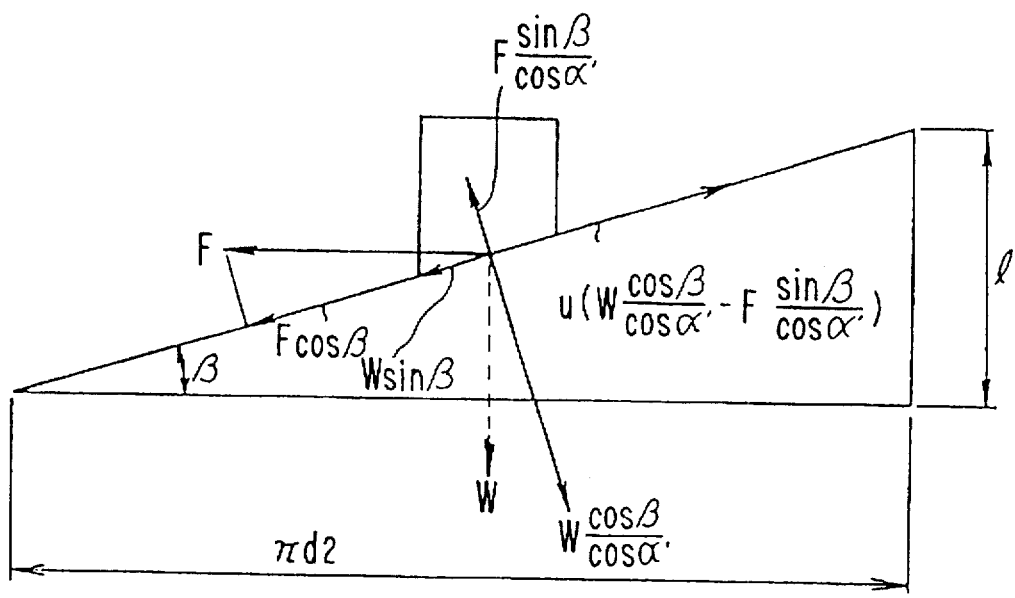
FIG. 20 is a diagram illustrating a development of a triangular screw thread to represent the equilibrium of forces in a triangular screw thread, according to an embodiment of the present invention.

FIG. 20 is a diagram illustrating a development of a triangular screw thread to represent the equilibrium of forces in a triangular screw thread, according to an embodiment of the present invention. More specifically, FIG. 20 represents the equilibrium of the forces on a surface perpendicular to the flank surface when the screw has been developed on the effective diameter $d_2$ of the triangular thread.

Referring now to FIG. 20, when the coefficient of friction on the flank surface of the screw is $\mu$, the force loosening the screw along the flank of the lead angle $\beta$ is the resultant of: (a) the component $F \cos \beta$, which is parallel to the flank of the lead angle, (b) the force F loosening the screw and (c) the component $W \sin \beta$, which is parallel to the flank, of the load W. Similar to Equation 2B in the case of the square thread, the force loosening the screw is $$F \cos\beta+W \sin\beta. \qquad \text{Eq. 18}$$

On the other hand, the force perpendicular to the flank surface of the screw becomes the difference of the component $F \sin \beta / \cos \alpha'$, perpendicular to the flank surface, of the force F loosening the screw and the component $W \cos \beta / \cos \alpha'$, perpendicular to the flank surface, of the load W acting on the female screw. The force to maintain the screw, opposing the force loosening the screw along the flank, is the frictional force acting in the screw flank surface, and depends on the coefficient of friction $\mu$ of the flank surface to forces perpendicular to the flank surface of the screw. Accordingly, it comprises:

$$\mu(W \cos\beta/\cos \alpha'-F \sin\beta/\cos\alpha). \qquad \text{Eq. 19}$$

Here, taking the expression $1/\cos \alpha$ outside the parenthesis in Eq. 19 and rearranging the equation, the following Eq. 20 is obtained:

$$(\mu/\cos \alpha')(W \cos \beta-F \sin\beta) \qquad \text{Eq. 20}$$

In Eq. 20:

$$\rho'=\tan^{-1}(\mu/\cos \beta), \qquad \text{Eq. 21}$$

where $\rho'$ is the converted friction angle in the flank surface. In other words, $\rho'$ is the angle of friction converted in accordance with the flank angle. Consequently, using the converted frictional force $\rho'$ in Eq. 20, the following Eq. 22 is obtained:

$$\tan\rho'(W \cos\beta-F \sin\beta) \qquad \text{Eq. 22}$$

Eq. 22, represented using the converted friction angle $\rho'$, is the frictional force resisting the force loosening the screw parallel to the flank of the lead angle $\beta$. Consequently, from FIG. 20, in the direction parallel to the flank of the lead angle $\beta$, the screw loosening force and the frictional force are in equilibrium. Therefore, Eq. 18 and Eq. 22 can be equated to obtain the following Eq. 23:

$$F \cos \beta+W \sin \beta=\tan \rho' (W \cos-F \sin\beta) \qquad \text{Eq. 23}$$

The following Eq. 24 is obtained by solving for the loosening force F and rearranging Eq. 23 using Eq. 6B:

$$F=W (\tan\rho'-\tan\beta)/(1+\tan \rho'\cdot\tan\beta) \qquad \text{Eq. 124}$$

On applying a trigonometric function theorem to Eq. 24, the following Eq. 25 is obtained:

$$F=W \tan (\rho'-\beta). \qquad \text{Eq. 25}$$

In Eq. 25, if $\beta<\rho'$(that is, if the lead angle $\beta$ is smaller than the converted friction angle $\rho'$), in a triangular thread, a tangential force F on the effective diameter $d_2$ becomes necessary to loosen the screw. Thus, the screw does not spontaneously loosen. If this type of triangular thread is used with the feed screw mechanism of an anti-vibration device, anti-vibration lens barrel 124 does not spontaneously move or rotating male screws 129 and 143 in the case that current is cut-off to y-axis direction drive motor 137 and x-axis direction drive motor 151, even if the dead weight of anti-vibration lens barrel 124 or the force of pre-load springs 128 and 142 is applied to female screws 126c and 140c.

In summary, in a lens apparatus according to the above embodiment of the present invention, the feed screw apparatus has a flank angle and the lead angle of the helical groove is smaller than the angle of friction converted in accordance with the flank angle.

In a camera according to the above embodiment of the present invention, anti-vibration lens barrel 124 is in a state of standstill in the position at which the current is cut off from y-axis direction drive motor 137 and x-axis direction drive motor 151. If anti-vibration lens 105 is in the centering position (that is, the position in which the optical axis I' of anti-vibration lens 105 coincides with the optical axis I) when the current is cut off from y-axis direction drive motor 137 and x-axis direction drive motor 151, anti-vibration lens 105 retains its centering position even if the current to y-axis direction drive motor 137 and x-axis direction drive motor 151 is cut off when the camera is being used for photography. Therefore, when photography is recommenced and current is passed to y-axis direction drive motor 137 and x-axis direction drive motor 151 to activate the anti-vibration function of the camera, the control range of anti-vibration lens 105 is maximized. As a result, a retaining member to retain the position centering anti-vibration lens 105 is not necessary and the drive mechanism of the anti-vibration lens can be simple.

In a triangular thread, by making the lead angle $\beta$ smaller than the converted friction angle $\rho'$, the feed screw mechanism lead angle $\beta$ may be selected as follows in order to retain the anti-vibration lens 105 in a given position (for example, to retain anti-vibration lens 105 in the centering position). For example, in the case of a triangular thread of a 60° thread, the flank angle a is 30°. In the case that the coefficient of friction $\mu$ of the flank surface was $\mu=0.35$, if the lead angle $\beta$ is selected as $\rho=21.663°$, from Equation 21 the converted friction angle $\rho'$ includes $\rho'=21.663°$. It can be seen that at this time $\beta=\rho'$.

That is, using a triangular thread of thread angle 60° in the feed screw mechanism of an anti-vibration device as shown in FIG. 12, when the coefficient of friction $\mu$ of the flank surface is $\mu=0.35$, anti-vibration lens 105 is retained in a given position (for example, the centering position) when current is cut off from y-axis direction drive motor 137 and x-axis direction drive motor 151. The lead angle $\beta$ may also be smaller than 21.663°. Namely, in the case in which a 60° triangular thread is used in the feed screw mechanism, when the coefficient of friction of the flank surface is 0.35, the lead angle may be made 21.663° or less. Then, when the current to y-axis direction drive motor 137 and x-axis direction drive motor 151 is cut off, anti-vibration lens barrel 124 does not move from the force of pre-load springs 128 and 142 or the force due to the dead weight of anti-vibration lens barrel 124 in the direction of gravity or in the direction of the pre-load. Anti-vibration lens barrel 124 is retained in a state of standstill. In other words, the position at which the current to y-axis direction drive motor 137 and to x-axis direction drive motor 151 has been cut off, anti-vibration lens barrel 124 can be retained in the centering position without any auxiliary support.

In a camera according to the above embodiments of the present invention, when the lead angle is smaller than the converted friction angle, anti-vibration lens barrel 124 does not move in the direction of gravity or the direction of pre-load and is instead retained in a state of standstill.

Figure 21:
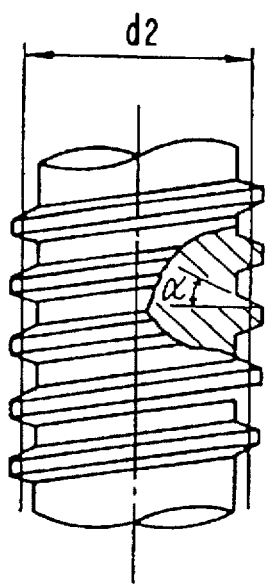
FIG. 21 is a diagram illustrating a flank angle of a trapezoidal screw thread, according to an embodiment of the present invention.

FIG. 21 is a diagram illustrating a flank angle of a trapezoidal screw thread of a feed screw mechanism, according to an embodiment of the present invention. The feed screw shown in FIG. 21, with a trapezoidal screw thread having a flank angle $\alpha$, operates in a similar manner as the feed screw of embodiments of the present invention described above.

In a camera according to the above embodiments of the present invention, by making the lead angle of a feed screw of an anti-vibration device of a camera less than a predetermined angle, there is no unexpected movement of the optical system even in the case that the force to rotate the feed screw is cut off. As a result, when the force to rotate the feed screw is cut off in the centering position of the optical system, centering is possible without the need for a centering mechanism. Thus, the structure of the anti-vibration device can be simplified by dispensing with a center lock mechanism.

In a camera according to the above embodiments of the present invention, in the case that a screw having no flank angle is used as a feed screw in a feed screw mechanism in an anti-vibration device, the lead angle of the screw can be made to be less than the friction angle of the flank surface. As a result, when the current to the motor is cut off, a falling movement caused by the dead weight of the optical system or due to pressurization force can be prevented and the structure of the anti-vibration device can be simplified by omission of a centering mechanism.

Moreover, in a feed screw mechanism of the anti-vibration device according to the above embodiments of the present invention, in the case that a screw having a flank angle is used as a feed screw, the lead angle of the screw can be made to be less than the converted friction angle. As a result, a falling movement caused by the dead weight of the optical system or due to pressurization force can be prevented and the structure of the anti-vibration device can be simplified by omission of a centering mechanism.

In a feed screw mechanism of an anti-vibration device according to the above embodiments of the present invention, by using a triangular thread in a feed screw, the construction of the feed screw mechanism becomes relatively simple and an inexpensive anti-vibration device can be made.

In a camera according to the above embodiments of the present invention, an optical system support member has a protuberance and is arranged integrally with an optical system. The protuberance fits into a rotatable feed screw provided with a helical groove. The optical system moves in a direction at right angles to the optical axis via the rotation of the feed screw. The lead angle of the helical groove is smaller than a predetermined angle. Moreover, the helical groove of the lead screw can be made to have no flank angle, with the predetermined angle as the angle of friction. In addition, the helical groove of the lead screw can be made to have a flank angle, with the predetermined angle as the angle of friction.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. A lens apparatus comprising:
   an optical system which is shiftable to compensate for vibrations affecting the lens apparatus;
   a first shift mechanism which shifts the optical system along a first axis; and
   a first urging mechanism which provides an urging force along the first axis to urge the optical system and to assist the first shift mechanism in shifting the optical system, the urging force of the first urging mechanism being approximately 1.5 to 5 times the weight of the optical system.

2. A lens apparatus as in claim 1, further comprising:

a second shift mechanism which shifts the optical system along a second axis, the second axis being perpendicular to the first axis; and a second urging mechanism which provides an urging force along the second axis to urge the optical system and to assist the second shift mechanism in shifting the optical system, the urging force of the second urging mechanism being approximately 1.5 to 5 times the weight of the optical system.

3. A lens apparatus as in claim 1, wherein the optical system comprises a anti-vibration lens and a lens frame which holds the anti-vibration lens, the weight of the optical system including the weight of the anti-vibration lens and the weight of the lens frame.

4. A lens apparatus as in claim 2, wherein the optical system comprises a anti-vibration lens and a lens frame which holds the anti-vibration lens, the weight of the optical system including the weight of the anti-vibration lens and the weight of the lens frame.

5. A lens apparatus as in claim 3, wherein the optical system further comprises rollers and roller shafts which allow the first shift mechanism to shift the optical system, the weight of the optical system including the weight of the rollers and roller shafts.

6. A lens apparatus as in claim 4, wherein the optical system further comprises rollers and roller shafts which allow the first shift mechanism and the second shift mechanism to shift the optical system, the weight of the optical system including the weight of the rollers and roller shafts.

7. A lens apparatus as in claim 1, wherein the lens apparatus is a camera having an optical axis, and the first axis is perpendicular to the optical axis.

8. A lens apparatus as in claim 2, wherein the lens apparatus is a camera having an optical axis, and the first axis and second axis are both perpendicular to the optical axis.

9. A lens apparatus, comprising:

a movable optical system to correct vibration of the lens apparatus;

a guide mechanism to guide the movable optical system such that the movable optical system moves within one plane; and an urging mechanism to urge the movable optical system with respect to said guide mechanism, the urging mechanism having an urging force in the range of 1.5 to 5 times the weight of the movable optical system.

10. A lens apparatus as in claim 9, wherein said movable optical system includes a vibration prevention lens and a frame to support the vibration prevention lens, and wherein the weight of the movable optical system includes the weight of the vibration prevention lens and the frame.

11. A lens apparatus as in claim 9, wherein said lens apparatus is a camera.

12. A lens apparatus as in claim 11, wherein the one plane is a plane that is perpendicular to an optical axis, and wherein the urging force acts in a direction parallel to the said one plane.

13. A lens apparatus as in claim 11, wherein the one plane is a plane that is perpendicular to an optical axis, and the urging force acts in a direction parallel to the optical axis.

* * * * *